United States Patent
Hara

(10) Patent No.: US 11,348,138 B2
(45) Date of Patent: May 31, 2022

(54) FEEDBACK-TYPE SNS USER INFORMATION COMMUNICATIVITY SCORING SERVER

(71) Applicant: Repohappy Co., Ltd., Osaka (JP)

(72) Inventor: Takeshi Hara, Osaka (JP)

(73) Assignee: REPOHAPPY CO., LTD., Osaka (JP)

( * ) Notice: Subject to any disclaimer, the term of this patent is extended or adjusted under 35 U.S.C. 154(b) by 31 days.

(21) Appl. No.: 16/327,202

(22) PCT Filed: Feb. 19, 2017

(86) PCT No.: PCT/JP2017/006020
§ 371 (c)(1),
(2) Date: Apr. 10, 2019

(87) PCT Pub. No.: WO2018/037592
PCT Pub. Date: Mar. 1, 2018

(65) Prior Publication Data
US 2019/0228434 A1  Jul. 25, 2019

(30) Foreign Application Priority Data

Aug. 25, 2016  (JP) .............................. JP2016-178044

(51) Int. Cl.
*G06Q 30/00* (2012.01)
*G06Q 30/02* (2012.01)
(Continued)

(52) U.S. Cl.
CPC ......... *G06Q 30/0255* (2013.01); *G06Q 30/02* (2013.01); *G06Q 50/00* (2013.01);
(Continued)

(58) Field of Classification Search
None
See application file for complete search history.

(56) References Cited

U.S. PATENT DOCUMENTS

| 10,580,024 B2 * | 3/2020 | Dhawan ............. G06Q 30/0205 |
| 2008/0140506 A1 * | 6/2008 | Christianson .......... G06Q 30/02 705/14.44 |

(Continued)

FOREIGN PATENT DOCUMENTS

| JP | 2012-078933 A | 4/2012 |
| JP | 5588292 B | 4/2012 |

(Continued)

OTHER PUBLICATIONS

Keller et al, How to use influencers to drive a word-of-mouth strategy, Apr. 2016, www.PrismJournal.com (Year: 2016).*

(Continued)

*Primary Examiner* — Naresh Vig
(74) *Attorney, Agent, or Firm* — Ogilvie Law Firm

(57) ABSTRACT

A scoring server makes it possible for a provider of advertising or other content to arbitrarily search for an influencer who is suited to a promotion and to easily control target numbers or target conditions, and is capable of making effects and results from distribution of the promotion feedback into impact and information communicativity and improving precision. This server is connected by a network to a subscriber terminal, an SNS server, and a content provision terminal. Said server: communicates with the SNS server and creates a score of a subscriber's information communicativity; provides content to the subscriber terminal which has been provided from the content provision terminal; and re-creates the score using an action history with respect to the SNS server in relation to the content of the subscriber terminal, and the response to the actions, as feedback elements.

20 Claims, 24 Drawing Sheets

(51) Int. Cl.
*G06Q 50/00* (2012.01)
*H04L 51/00* (2022.01)
*H04L 51/52* (2022.01)
*H04L 67/50* (2022.01)

(52) U.S. Cl.
CPC .............. *H04L 51/16* (2013.01); *H04L 51/32* (2013.01); *H04L 67/22* (2013.01); *G06Q 50/01* (2013.01)

(56) References Cited

U.S. PATENT DOCUMENTS

| | | | |
|---|---|---|---|
| 2013/0254283 A1 | 9/2013 | Garcia-Martinez et al. | |
| 2014/0025478 A1* | 1/2014 | Mischuk ............ | G06Q 30/0242 705/14.41 |
| 2014/0089323 A1 | 3/2014 | Wu et al. | |
| 2014/0257921 A1* | 9/2014 | Bear ................. | G06Q 30/0269 705/7.29 |
| 2014/0280222 A1* | 9/2014 | Braytenbaum ... | G06F 16/24578 707/748 |
| 2015/0302444 A1* | 10/2015 | Sundaresan ........ | G06Q 30/0214 705/14.16 |
| 2016/0217489 A1* | 7/2016 | Allard ................ | G06Q 30/0246 |

FOREIGN PATENT DOCUMENTS

| | | |
|---|---|---|
| JP | 2012-519336 A | 8/2012 |
| JP | 2014-021889 A | 2/2014 |
| JP | 2014-029726 A | 2/2014 |
| JP | 2014-038547 A | 2/2014 |
| JP | 2015-232793 A | 12/2015 |

OTHER PUBLICATIONS

Information on VigLink.com, 2016, www.viglink.com, printed through www.archive.org (date is in the URL in YYYYMMDD format) (Year: 2016).*

Kathleen Stansberry, Identifying and engaging online influencers through social web, 2015, www.PrismJournal.com (Year: 2015).*

Keller et al., How to use influencers to derive a word-of-mouth strategy, Apr. 2016, www.prismjournal.org (Year: 2016).*

Anger et al., Measuring Influence on Twitter, Sep. 7, 2011, ACM Digital Library (Year: 2011).*

Bughin et al. published article "A new way to measure word-of-mouth marketing", Apr. 2010, McKinsey & Company (Year: 2010).*

International Search Report, PCT/JP2017/006020, dated May 30, 2017, 4 pages.

* cited by examiner

Fig.5

| | Name | Mail address | Birth date | Sex | Address | Occupation | Privilege reception area | Category of received benefit | Basic score | Additional score | Intensity of category 1 | Intensity of category 2 | ... |
|---|---|---|---|---|---|---|---|---|---|---|---|---|---|
| Subscriber A | HARA Taroshi | **@** | 1972/09/08 | 1: male | Toyonaka-shi, Osaka, ... | 1: Company manager | 37: Osaka 28: Hyogo | 1: Restaurant 2: Cafe 3: ... | 12,000 | 150 | 50% | 20% | |
| Subscriber B | | | | | | | | | | | | | |
| Subscriber C | | | | | | | | | | | | | |

Fig.7

| | SNS type | Number of friends | Score in number of friends | Number of posting | Score in number of Posting | Number of comments acquired | Score in number of comments acquired | Number of good evaluations acquired | Score in number of good evaluations acquired | Number of days elapsed since the last post | Score in number of days elapsed since the last post |
|---|---|---|---|---|---|---|---|---|---|---|---|
| Subscriber A | Facebook | 1,000 | 100 | 20 | 4 | 20 | 2 | 280 | 28 | 2 days | ±0 |
| Subscriber B | | | | | | | | | | | |
| Subscriber C | | | | | | | | | | | |

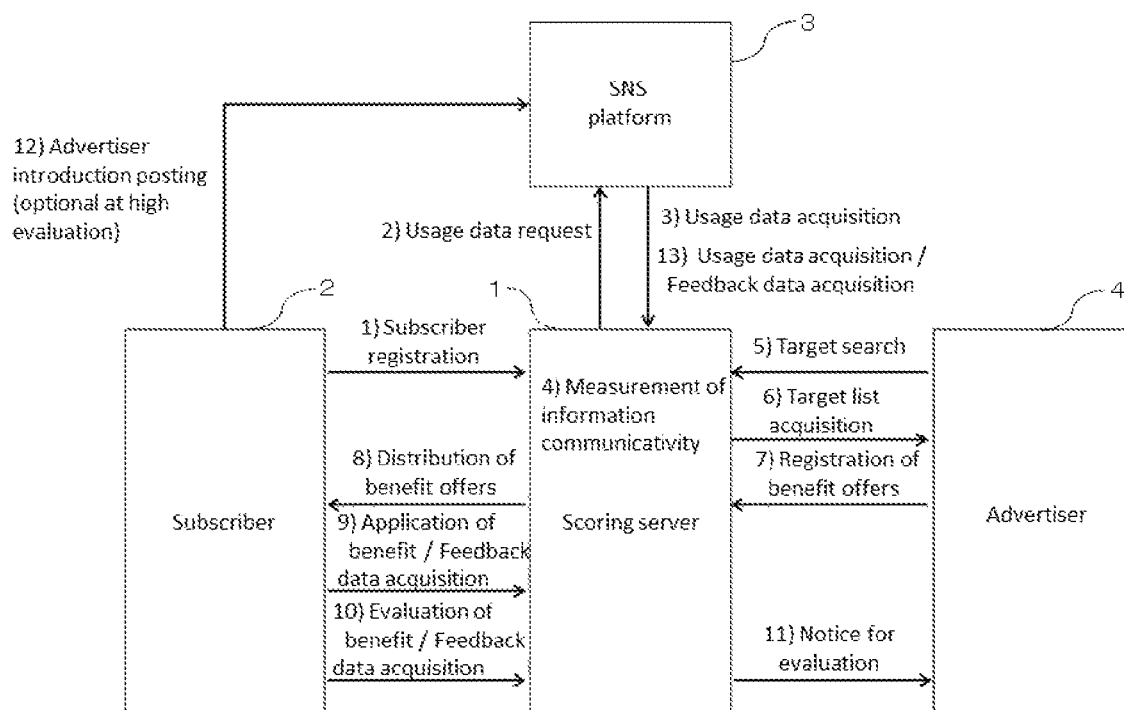

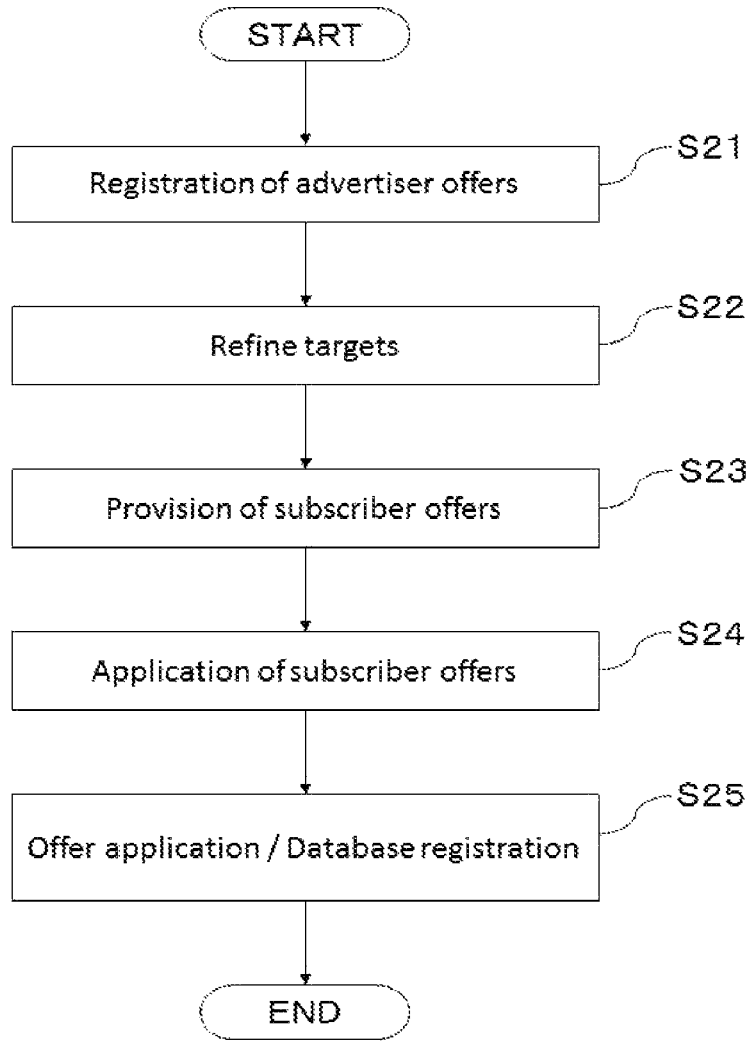

Fig.10

<Setting of benefit offers contents>
Offer date / Offer time zone / Number of recruitment groups / Number of people per group / Title of offers / Offer object contents / Price of benefit offers, Discount rate / Image registration of benefit content / URL of EC site for product purchase / Questionnaire items, etc.
<Setting of narrowing down of benefit offers>
Usage SNS type / Sex / Occupation / Married, Single / SNS communicativity / Rate (number) of fill-in reports / Trend of questionnaire evaluation / Share rate (number), etc.

Refine setting of benefit invitees

Setting invitation conditions

| | |
|---|---|
| SNS | Facebook |
| Sex | Unspecified |
| Age group | 20 years old ~ Unspecified |
| Occupation | ☐ Company manager, Officer ☐ Employee Manager ☐ Employee Staff<br>☐ Employee Office worker, OL ☐ Temporary staff, Contract employee<br>☐ Part-timer staff ☐ College student ☐ Vocational school student<br>☐ Self employed ☐ Public officials　Manager<br>☐ Public officials　General staff ☐ Public officials　Office worker, OL<br>☐ Professional athlete ☐ Professional artist ☐ Masters, Profession<br>☐ Doctor, Medical personnel ☐ Housewife ☐ Unemployed<br>☐ Other ☒ Not specified |
| Married / Single | Unspecified |
| SNS communicativity | Unspecified |
| Birth month designation | Unspecified |
| | ☐ Including the subscribers who invited to the store in the past.<br>(If you do not check, subscribers you have invited in the past will be automatically removed.)<br>☐ Excluding subscribers with low report entry rate.<br>☐ Excluding subscribers with tendency of low questionnaire evaluation. |
| Confirmation of target number | Search results : 204 people<br>Area is set automatically.<br>Invitation will be sent to the subscribers who selected the shop's address in the activity area. |
| | ☒ Memory of invitation conditions |
| | Return |

Fig.13
Contents of benefit invitation
(1)
(2)

Fig.14
Detailed information of invitation / Application of benefit (Shop offer)
(1) (2) (3)
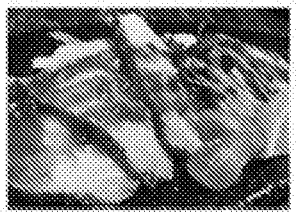
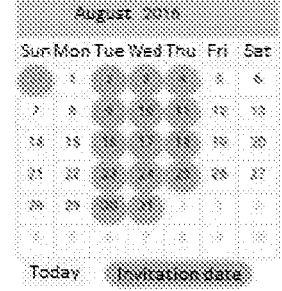

Fig.15

| | Offer ID | Date of application | Subscriber ID | Subscriber name | SNS communicativity | Number of people | Contact phone number | Address | Mail address | Comment field | Date of visiting/Execution date of benefit | Smoking condition | Conditions of accompanying children |
|---|---|---|---|---|---|---|---|---|---|---|---|---|---|
| Subscriber A | 0010000 2 | 2016/08/11 | 0000023 | HARA, Takeshi | 30 | 4 | 090**- | Toyonaka-shi, Osaka, | *@*** | Only 1 child | 2016/08/25 | Yes | Accompany |
| Subscriber B | | | | | | | | | | | | | |
| Subscriber C | | | | | | | | | | | | | |

. . . .

Fig.18
User posting view
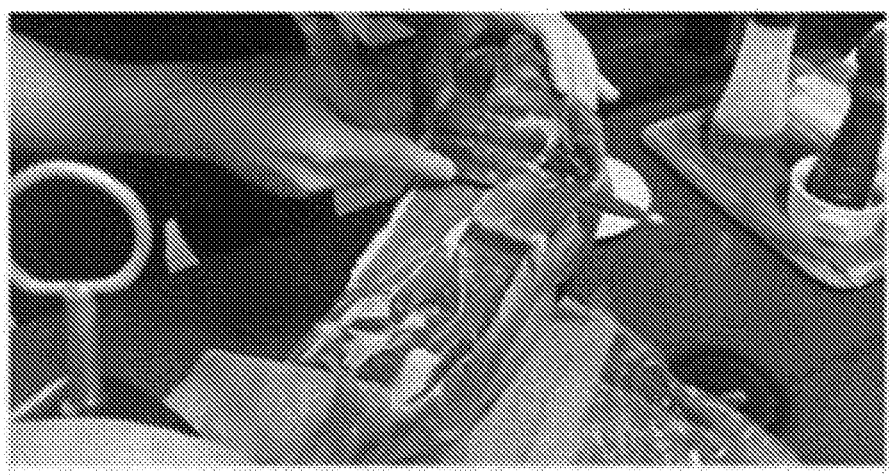

Fig.19

| Recalculation ID | Date added | Added subscriber ID | Pre-recalculated score | presence or absence of report fill-in | Score on presence or absence of report fill-in | Presence or absence of sharing after report | Number of postings response after report | Score on number of postings response after report | Category of strength addition | Total number of category posting |
|---|---|---|---|---|---|---|---|---|---|---|
| 20001 | 2016/08/26 | 000023 | 12,000 | 1 | 100 | 1 | 30 | 6 | +1 | 1 |

| | |
|---:|:---|
| Age range | 20s - 40s |
| Sex | Only female |
| Married / Single | Married |
| Conditions regarding children | Yes: Elementary school student |
| Setting of birth month | Yes |
| SNS communicativity | 3 or more |
| Narrowed down by interests | ☑ Gourmet<br>☐ Travel<br>☐ Parenting<br>☐ Education<br>☐ Politics<br>☐ Movies<br>☐ Health |

☐ Memory of search condition (2)

Number of targets    Total

※Distribution to a maximum of 3,500 people

- Facebook users    2,500 people
- Twitter users    1,200 people
- Instagram users    800 people
- Line users    2,500 people Priority
- ⦿ In order of interest — 200 people
- ○ Subscribers with few invitations distributed — people
- ○ In descending order of responses — people
- ○ SNS communicativity order — people
- ○ Random and automatic selection — people
- ○ All Search    Search results    Home

FEEDBACK-TYPE SNS USER INFORMATION COMMUNICATIVITY SCORING SERVER

TECHNICAL FIELD

The present invention relates to a computing technology which calculates and measures an information communicativity of a user of a social networking service (hereafter referred to as SNS) by an algorithm, and after giving a score, filters users based on a user's registration information and the score, and provides various promotions from advertisers to a user, e.g., offers (eating and drinking, events, travels, sales, etc.) with a benefit.

BACKGROUND ART

As well known, many Internet users post their events using SNS. SNS has a strong propagation power in which it is followed by a user's acquaintances and spreads information, and the user with many followers has high information communicativity and influence.

Focusing on this information communicativity, technologies and services that are utilized for advertisement and promotion with a network have also been devised, and they are called influencer marketing. Postings by users with high information communicativity are expected to spread the promotion widely through word-of-mouth reviews by followers.

For example, an advertisement providing method and system for effectively advertising to users on SNS by deriving characteristics of users whom advertisers wish to target and creating scores is known (refer to Patent literature 1). In the advertisement providing method and system disclosed in the above Patent literature 1, the influence is scored based on the activity level of the users and the acquaintance relationships, so that advertisement distribution price is set higher for users with high influence than users with low influence.

Also known is a campaign method that causes word-of-mouth reviews by eliciting mutual remarks on campaigns between influencers and other subscribers (refer to Patent literature 2). This is to set thresholds for influence scores so that influential users who are allowed to participate in the campaign can distribute benefits to acquaintances.

Further, an influencer extracting apparatus, a method, and a program for extracting influencers from among users in social media are known (refer to Patent literature 3). This is to digitize the spread of written information between users, extract influential users, and transmit written information.

However, neither the advertisement providing method and system disclosed in Patent literature 1, the campaign method disclosed in Patent literature 2, nor the influencer extracting apparatus, method and program disclosed in Patent literature 3 has a mechanism for re-creating the score. So there is the problem that an advertisement reflecting interests, concerns, and behavioral characteristics can't be sufficiently performed.

PRIOR ART

Patent Literature

[Patent literature 1] JP 2014-29726 A
[Patent literature 2] JP 2014-38547 A
[Patent literature 3] JP 5588292 B

OUTLINE OF THE INVENTION

Problems to be Solved by the Invention

In conventional services, providers of content such as advertisements could not easily control the number and conditions of targets by arbitrarily narrowing down influencers that match the promotion according to their interests, concerns, and behavior characteristics. In addition, it was impossible to improve the precision by feeding back the effects, and the influence of the results, of information communicativity after distributing the promotion.

Also, by using conventional services, it is possible to distribute advertisements for specific SNS users with high influence and high information communicativity and offer benefits. But it is impossible for advertisers to easily control the number of targets and target conditions as desired by narrowing down the influencers matching the promotion. In addition, it was impossible to improve the precision by feeding back the effect and the result to the information communicativity after distributing the promotion.

In view of such a situation, the present invention aims to provide a scoring server with which it is possible for a provider of advertising or other content to arbitrarily search for an influencer who is suited to a promotion and to easily control target numbers or target conditions, and which is capable of making effects and results following the distribution of the promotion feed back to impact information communicativity and improve precision.

Means to Solve the Objects

In order to achieve the above objects, the scoring server according to the present invention is connected by a network to a subscriber terminal, an SNS server, and a content provision terminal, and the server communicates with the SNS server and creates a score of a subscriber's information communicativity, and the server provides content to the subscriber terminal which has been provided from the content provision terminal. The server re-creates the score with an action history with respect to the SNS server in relation to the content of the subscriber terminal and the response to the action history as feedback elements. Here, the subscriber terminal is a terminal used by users who are provided contents, and the SNS server is a server that manages the SNS. Also, the content provision terminal is a terminal used by users who provide contents, and specifically, for example, a terminal used by an advertiser offering benefits.

According to the scoring server of the present invention, the information communicativity of users using a SNS is scored. The content provider such as an advertiser filters target users based on the registered information and score of the user. The scoring server provides the user benefit offers (foods, events, travel, merchandise, etc.). Also, by reporting the user's action history and responses on behaviors after benefit offers to the content provider, and re-creating scores regarding the information communicativity, contents provision that is more suitable for the customer's interests, concerns and behavioral characteristics is possible.

Here, the score is calculated based on at least one of: a number of friends of the subscriber, a number of followers of the subscriber, a posting amount, a posting frequency, and a number of responses in one or more SNS services provided by the SNS server. Here, the number of friends refers to the number of those who have been approved as friends between users, and the number of followers is the number of users set in a state wherein their posts and the like can be seen. In addition, the number of responses means a number of comments, a number of tweets, a number of shares, a number that expressed "Like!", and so on.

Also, the action history comprises preferably an access operation including posting and sharing action to the SNS server, and the one or more responses to the action are reaction operations including friends or followers of the subscriber communicating to the SNS server through one or more of: browsing, inputting comments, and sharing actions. Here, the action history includes statements of "Like!", Tweets and so on. In addition, a response to the action includes expressions of "Like!", actions by subscriber terminals related to the provided contents to the SNS server, retweets, and so on.

In the scoring server according to the present invention, the score is calculated based on actions during a predetermined period in the past. The predetermined period of time is, for example, 10 days, 30 days, a half year, 1 year, or the like.

In the scoring server according to the present invention, re-creating the score preferably comprises performing a calculation based on a number of responses to the subscriber's actions of posting from the subscriber terminals to the SNS service which is provided by the SNS server.

In the scoring server according to the present invention, re-creating the score preferably comprises performing a calculation using information obtained from a questionnaire about the content provided to the subscriber terminal. By using not only behaviors toward the SNS server, but also employing questionnaire information transmitted to the scoring server, it is possible to realize scoring with higher precision.

In the scoring server according to the present invention, re-creating the score is preferably calculated with using a presence or absence of browsing action of the subscriber terminal with respect to contents. More accurate scoring becomes possible by using not only actions toward the SNS server but also data on the presence or absence of browsing acts sent to the scoring server.

In the scoring server according to the present invention, the content provision terminal preferably filters the subscriber providing the content based on the subscriber registration information and the score calculated. Here, the subscriber registration information includes not only the registration information that the subscriber has transmitted to the scoring server, but also the registration information and the usage situation in the SNS server transmitted from the SNS server used by the subscriber to the scoring server (the number of posts etc.).

In the scoring server according to the present invention, re-creating the score preferably includes re-calculating for each category type, going to the past for a predetermined period set for each category type of the content. For example, in the case of categories of eating and drinking and traveling, it is considered that travel categories need to employ data of longer period than those for eating/drinking, and thus a longer predetermined period such as several months is set and recalculation can be performed.

In the scoring server according to the present invention, re-creating the score is able to use category strengths for each category type as parameters of scoring. Here, the category strength represents the interest, concern and behavioral characteristics of subscribers as parameters by displaying the total number of SNS responses for each category, or displaying the ratio of SNS responses for each category in the total responses of a certain user.

Category strength for each category type is multiplied by feedback factors other than category strength, so that scoring with higher accuracy becomes possible.

For example, when scoring by a feedback element other than category strength is set as general scoring, and when a subscriber B being evaluated as having high information communicativity but having low interest/concern about a category "travel" and a subscriber C being evaluated as having low information communicativity but having high interest/concern about a category "travel" are compared without considering the parameter about category intensity, the subscriber B being evaluated as having high information communicativity in general scoring becomes evaluated as a subscriber being more fit to contents provision. However, when the parameters of the category intensity are taken into account and the target is narrowed down for the provision of the contents relating to "travel", the subscriber C could be evaluated as more suitable for providing contents. Further, the subscriber B may be evaluated as a subscriber more suitable for contents provision, depending on the numerical values of the parameters of the subscribers B and C.

In the scoring server according to the present invention, the content is an advertisement content, and the scoring server may provide subscriber registration information and the score to the content provision terminal, and the scoring server transmits the benefit offer content provided by the content provision terminal to the subscriber terminal filtered by the content provision terminal. Here, the advertisement content is not limited to those that clearly indicate that it is an advertisement, but the advertisement content refers to those having an advertisement effect in a broad sense. The benefit offer content refers to the benefit to be presented to the subscriber from the advertiser, specifically, such as a discount service or free ticket offering.

In the scoring server according to the present invention, the scoring server may calculate the score, when the SNS service provided by the SNS server does not disclose the data for calculating the subscriber's information communicativity, by automatically visiting the SNS site of the subscriber, and by reading text data, and by extracting at least either a number of followers, a number of friends, a posting amount, a posting frequency, or a number of responses. By automatically visiting the subscriber's SNS site and reading the text data, it becomes possible to perform scoring even when the SNS service used by the subscriber does not disclose calculation data. Note that the evaluation value here is calculated based on the calculation data, and the calculation data refers to at least one of the subscriber's follower, the number of friends, the posted amount, the posting frequency, and the number of comments. However, it is also possible to calculate the evaluation value by using information other than these calculation data, for example, using information directly registered by the subscriber on the scoring server or subscriber information on other SNS services.

In the scoring server according to the present invention, the scoring server may read the web page of a follower automatically by tracing the subscriber's follower link and extracting data for calculating the subscriber's information communicativity. By following the link of the subscriber's follower, scoring with higher accuracy becomes possible. Here, the calculation data means the number of shares for subscribers' postings, the number of comments to subscribers, and the like.

In the scoring server according to the present invention, the score calculated may be provided in accordance with requests from an external server. Since the score can be provided in response to the request of an external server, the convenience of the user desiring to be provided with the content can be improved.

In the scoring server according to the present invention, a parameter of category strength for each category type may be provided in accordance with requests from an external server. By being able to provide the parameter of the category strength for each category type in response to the request of the external server, it is possible to improve the convenience of the user who wants to be provided with the content according to the category strength.

In the scoring server according to the present invention, the scoring server may transmit a dedicated code generated according to subscriber registration information composed of tags or alphanumeric characters to the subscriber terminal, and when there are inquiry requests from other computers, the scoring server responds with the score of the subscriber corresponding to the dedicated code, and causes other computers to show the score of the subscriber by communicating using the tag.

In a processing method of the scoring server according to the present invention, the method suitable to be performed in an environment which includes a server that is connected by a network to a subscriber terminal, an SNS server, and a content provision terminal, the method comprises the following steps.

1) a step of communicating with the SNS server and creating a score of a subscriber's information communicativity.

2) a step of providing content to the subscriber terminal using content which has been provided from the content provision terminal.

3) a step of re-creating the score with an action history with respect to the SNS server in relation to the content of the subscriber terminal and the response to the action as feedback elements.

A processing program of the scoring server causes a computer to execute each step of the processing method of the scoring server.

In the scoring server according to the present invention, the scoring server is connected by a network to a subscriber terminal, an SNS server, and a content provision terminal, and the scoring server comprises the following means.

1) a means of communicating with the SNS server and creating a score of a subscriber's information communicativity.

2) a means of providing content to the subscriber terminal which has been provided from the content provision terminal.

3) a means of re-creating the score using an action history with respect to the SNS server in relation to the content of the subscriber terminal, and the response to the action history, as feedback elements.

Means for solving the problem above is shown specifically in the following (1) to (17).

(1) It is a computing method implemented in a server system that measures and scores the subscriber's information communicativity in the SNS, and transmits a benefit offer.

(2) Subscriber information such as an address, a work place, age, sex, ID and a password can be acquired and registered in the database and linked with the scoring server.

(3) In the present system, the scoring server communicates with the API of the SNS, and the API and database of the Internet service used by the user, and saves the activity record including at least the posting for each user and the response from other users.

(4) The system periodically tabulates the saved behavior records and obtains subscriber's aggregate data including the number of postings in the most recent predetermined period and the number of responses of other subscribers for each subscriber.

(5) The present system periodically executes a process of scoring the subscriber's information communicativity based on aggregated data by subscriber.

(6) The scoring process uses the number of friends and followers as a score-up factor, the number of posts as a score-up factor, and the number of responses as a score-up factor. The score associated with the subscriber ID is determined by an algorithm such as a score-up element that the number of days from the final post day until the current day is short.

(7) The advertiser can register benefit offer content from the scoring system advertiser management screen.

(8) The advertiser can narrow down the benefit offer acquirer on the condition of subscriber information/scoring from the scoring server advertiser management screen.

(9) The benefit offer can be sent electronically to the subscribers narrowed down by the advertiser.

(10) The scoring server communicates with the offer transmission service system and the API of the SNS, the subscriber participates in the benefit offer, posts, and saves the reaction record of the individual subscriber including at least the number of responses.

(11) The advertiser can view the result data of the sent benefit offer on the scoring system advertiser management screen.

(12) The present system executes reevaluation processing of scoring of the subscriber's information communicativity based on the subscriber-by-subscriber reaction data for each benefit offer.

(13) When the SNS for acquiring the subscriber data of (3) above does not disclose the API, a bot ("robot") in cooperation with the scoring server visits the subscriber's SNS site and reads the text data.

(14) Extract the subscriber's information communicativity data from the text data.

(15) The robot follows the link of the subscriber's followers, reads the pages of the followers, and extracts secondary information communicativity data.

(16) A subscriber can install dedicated codes consisting of tags and alphanumeric characters capable of displaying his/her own score at a subscriber page of a participating social network or can input at log-in information of the Internet service site to be utilized, and tags to display a user's score are acquired by communicating with a scoring server.

(17) Calculate the score of the promotion ability by category of the user who participated in the promotion.

Effects of the Invention

According to the scoring server of the present invention, it is possible that the advertiser targets consumers with high information communicativity, which is assumed to be based on the information communicativity of SNS, in addition to the attribute of consumers, and performs promotion distribution. According to the present invention, there is an expected effect that the cost effectiveness can be remarkably

BRIEF DESCRIPTION OF THE DRAWINGS

FIG. 5 is an example of subscriber registration data.

FIG. 7 is an example of basic scoring data for information communicativity.

FIG. 8 is a functional explanatory diagram of the scoring server according to Embodiment 1.

FIG. 9 is a flow chart of the scoring server of Embodiment 1 from an offer registration to disclosure and application.

FIG. 10 is a view showing an advertiser offer registration data.

FIG. 11 is an example of an advertiser offer creation view (setting of benefit contents to offer).

FIG. 12 is an example of an advertiser offer creation view (setting of target filtering).

FIG. 13 is a view showing a subscriber's offer.

FIG. 14 is a view showing a subscriber's offer application.

FIG. 15 is a view showing an advertiser offer and an application database.

FIG. 18 is a posting view showing an information diffusion screen (share assistance function).

FIG. 19 is an example of a subscriber score recalculation table.

FIG. 27 is an example view of an advertiser's offer creation according to Embodiment 3, in which (1) is an example view for narrowing down targets showing contents, and (2) is an example view for narrowing down the number of targets.

BEST MODE FOR CARRYING OUT THE INVENTION

Embodiments of the present invention will be described in detail below with reference to the drawings. The present invention is not limited to the following embodiments and examples shown in the figures, and many modifications and variations are possible.

Embodiment 1

Figure 1:
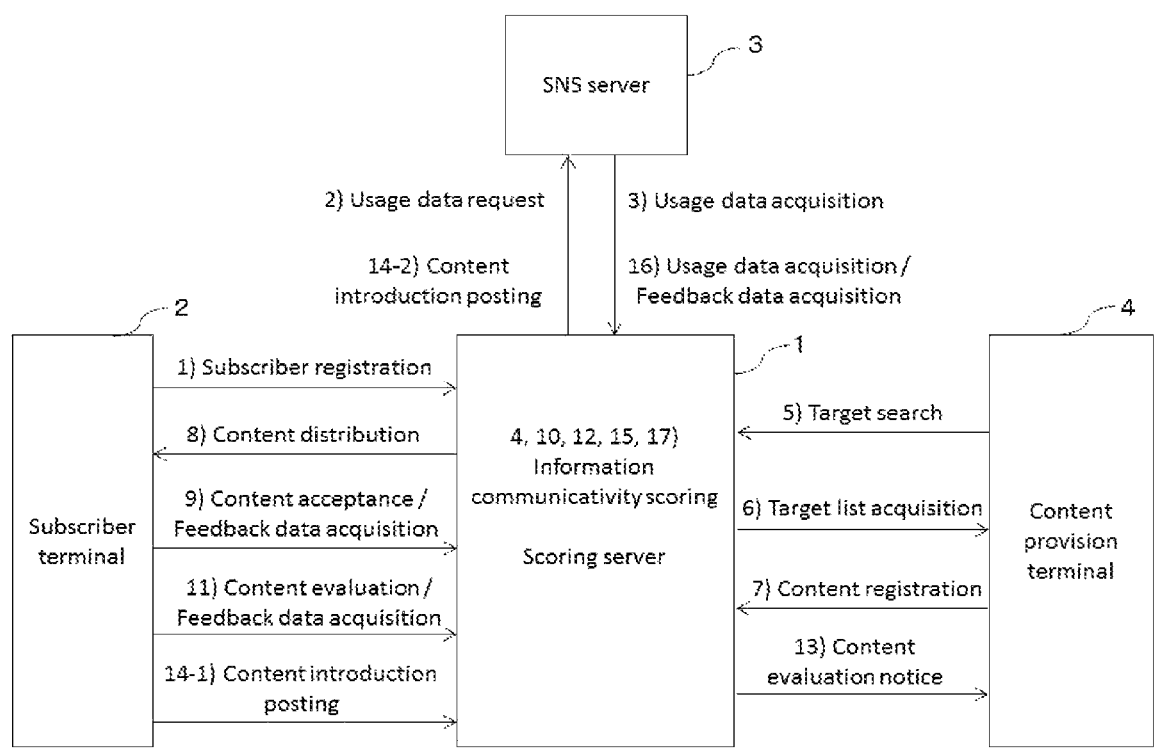
FIG. 1 is a functional block diagram of a scoring server according to Embodiment 1.

FIG. 1 shows a functional block diagram of the scoring server of Embodiment 1. As shown in FIG. 1, in the subscriber terminal 2, 1) when the subscriber registration is performed, the subscriber information is stored in the scoring server 1.

2) Based on the registered subscriber information the scoring server 1 requests usage data regarding the subscriber 2 from the SNS server 3.

3) The scoring server 1 obtains usage data from the SNS server 3.

4) The scoring server 1 performs scoring of information communicativity.

The content provision terminal 4 transmits data on the search condition to the scoring server 1.

5) The content provision terminal 4 performs a target search.

6) The search result is transmitted from the scoring server 1 to the content provision terminal 4 and the content provision terminal 4 obtains a target list.

7) The content provision terminal 4 pertains content registration to the scoring server 1 based on the acquired target list.

8) Content is distributed from the scoring server 1 to the targeted subscriber terminal 2. If the subscriber 2 accepts or does not accept the content, 9) feedback data regarding content acceptance is sent to the scoring server 1.

10) The scoring server 1 performs scoring of information communicativity regarding content acceptance.

11) When the subscriber 2 evaluates the content, feedback data regarding the evaluation is sent to the scoring server 1.

12) The scoring server 1 performs scoring of information communicativity regarding content evaluation.

13) The evaluation regarding the content is sent by notification from the scoring server 1 to the content provision terminal 4.

The subscriber 2 makes a content introduction post to the SNS server 3 via the scoring server 1.

14-1) Specifically, the subscriber 2 transmits data on the content introduction post to the scoring server 1, and 14-2) further, data regarding content introduction post is transmitted from the scoring server 1 to the SNS server 3. This is done by sending data about the post.

15) The scoring server 1 performs scoring of information communicativity regarding content introduction posting.

16) The scoring server 1 acquires usage data and acquires it as feedback data. The usage data here includes the response to the post.

Figure 2:
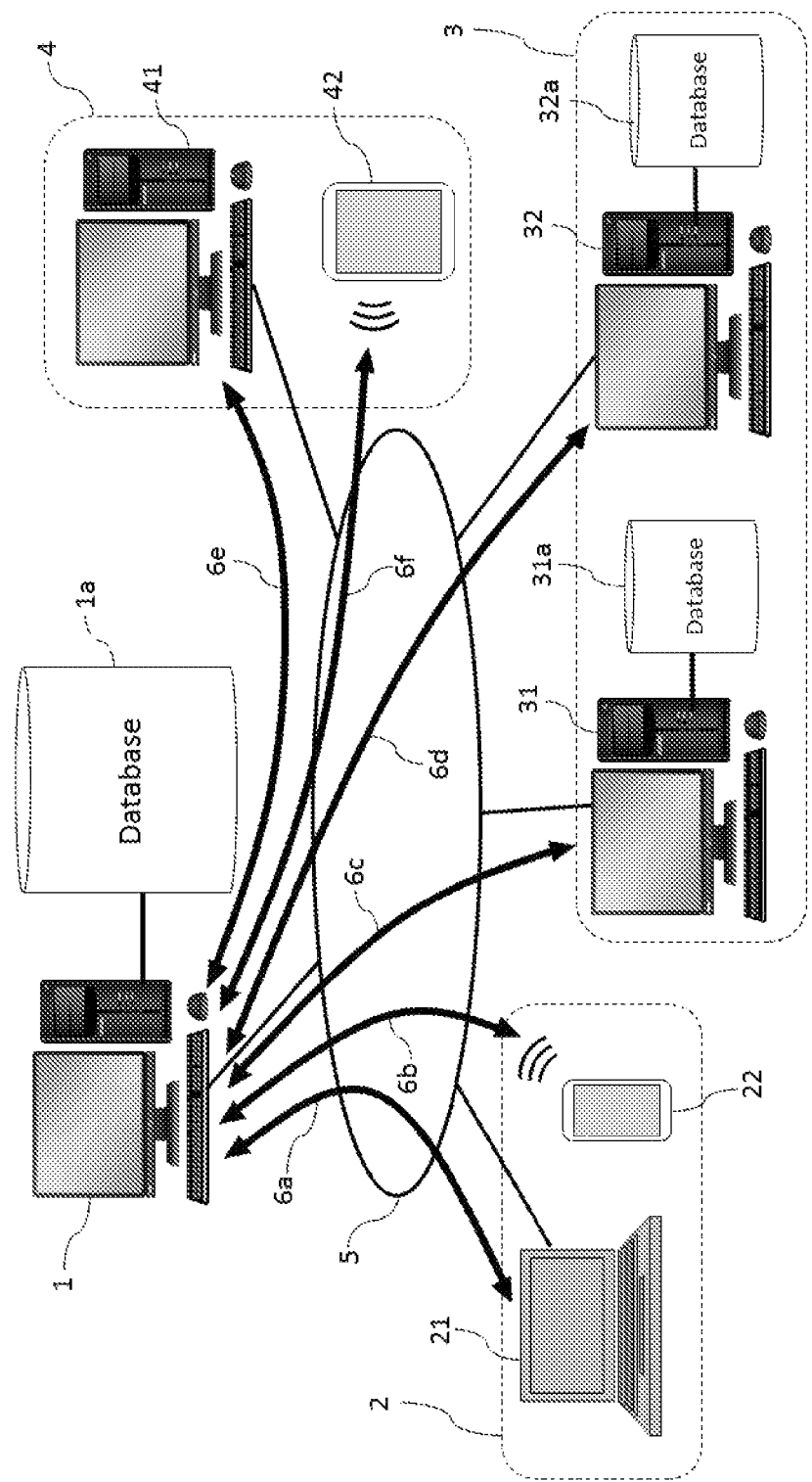
FIG. 2 is a system configuration diagram of the scoring server according to Embodiment 1.

FIG. 2 shows a system configuration diagram of the scoring server of Embodiment 1. As shown in FIG. 2, the scoring server 1 reaches a subscriber terminal 2, an SNS server 3, and a content provision terminal 4 via the network 5. The scoring server 1 is provided with a database 1a.

The subscriber terminal 2 comprises a subscriber terminal 21 and a subscriber terminal 22. The SNS server 3 includes an SNS server 31 and an SNS server 32. The SNS server 31 is provided with a database 31a. Further, the SNS server 32 is provided with a database 32a. The content provision terminal 4 includes a content provision terminal 41 and a content provision terminal 42.

The subscriber terminal 21 is a notebook PC, and the subscriber terminal 22 is a smartphone. Further, the content provision terminal 41 is a desktop PC, and the content provision terminal 42 is a tablet terminal. Note that the scoring server 1, the subscriber terminal 2, the SNS server 3, and the content provision terminal 4 are connected by a wired or wireless network.

The type of subscriber terminal is not limited to a notebook PC and a smartphone, and a wide range of devices such as a desktop PC and a tablet terminal can be used. Similarly, the type of content provision terminal is not limited to the desktop PC and the tablet terminal, and a wide range of devices such as a notebook PC and a smartphone can be used.

Further, the number of subscriber terminals and content provision terminals is not limited to two each, and a large number of subscriber terminals and content provision terminals can be simultaneously used. Also for the SNS server 3, three or more SNS servers can be connected.

Arrows (6a to 6f) illustrated in FIG. 2 are images which represent transmission and reception of data. Arrow 6a represents data transmission and reception between scoring server 1 and subscriber terminal 21. Similarly, arrow 6b indicates scoring server 1 and subscriber terminal 22, arrow 6c indicates scoring server 1 and SNS server 31, arrow 6d indicates scoring server 1 and SNS server 32, arrow 6e indicates scoring server 1 and content provision terminal, arrow 41f and arrow 6f indicate data transmission and reception between the scoring server 1 and the content provision terminal 42.

Figure 3:
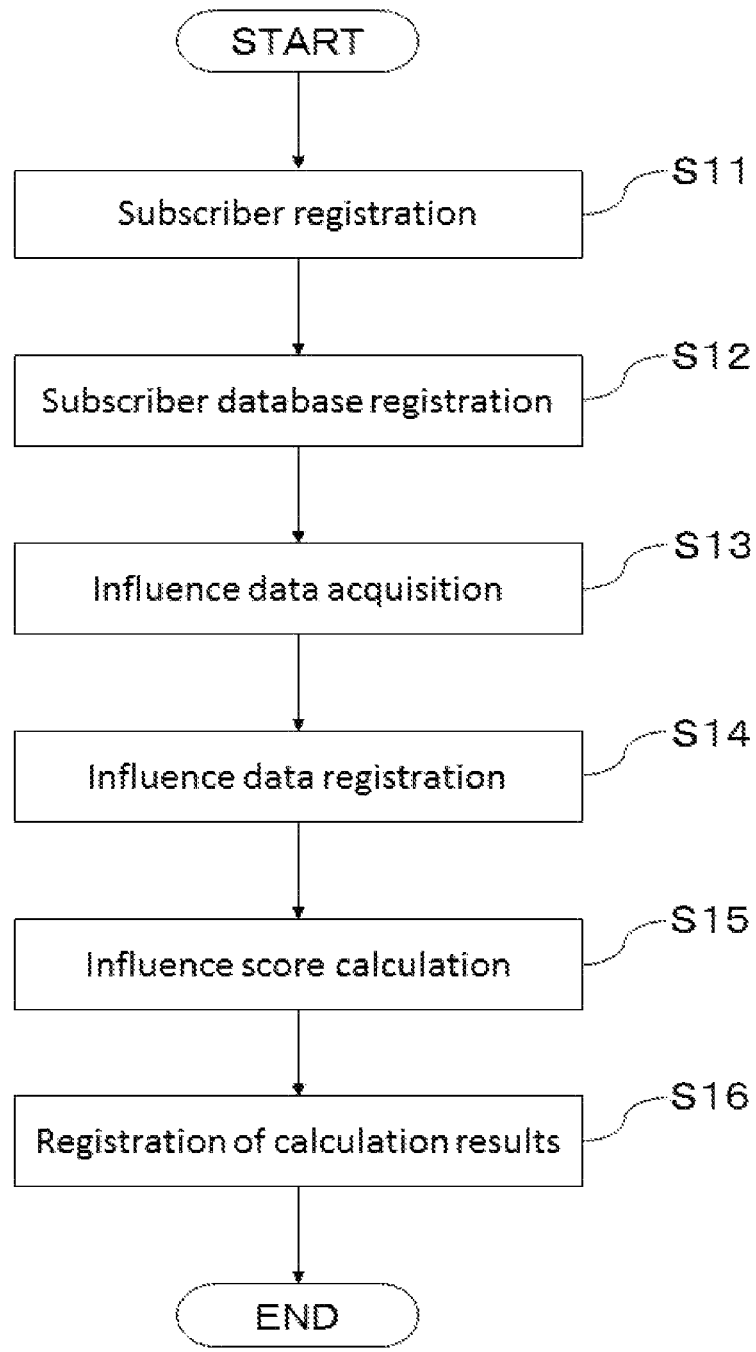
FIG. 3 is a flow chart of the scoring server of Embodiment 1 from subscriber registration to data collection and creating scores.

FIG. 3 shows a flow chart from subscriber registration of the scoring server of Embodiment 1 to data collection and scoring. As shown in FIG. 3, first, a user who uses an SNS performs subscriber registration into the scoring server (subscriber registration step: S11). Subscriber registration is completed by entering the SNS registration account into this system and registering additional information.

Next, the input subscriber data is registered in the database (subscriber data DB registration step: S12). The scoring server performs data communication with the SNS server to acquire influence data about the subscriber (information communicativity data acquisition step: S13). The influence data obtained from the SNS server is registered in the scoring server (information communicativity data registration process: S14). In the scoring server, the subscriber's influence score is calculated (scoring step of information communicativity: S15). The result obtained by calculation is registered in the scoring server (calculation result registration step: S16). The scoring process of the information communicativity and the calculation result registration process correspond to the scoring in the present specification.

Figure 4:
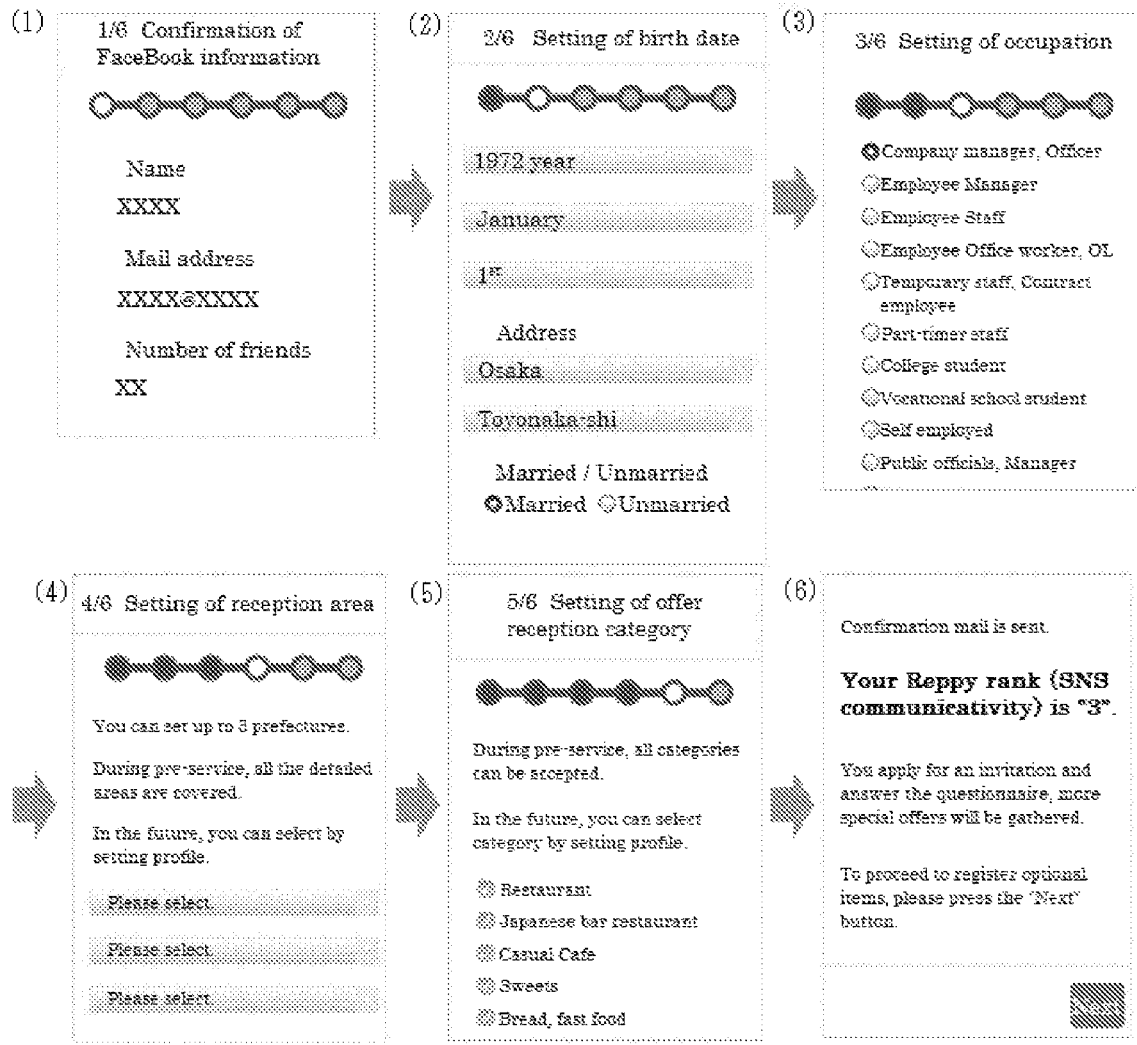
FIG. 4 is an image diagram of a subscriber registration view in a subscriber terminal.

FIG. 4 shows an image diagram of a subscriber registration screen on the subscriber terminal. As shown in FIG. 4 (1), firstly, the name, the e-mail address, and the number of friends are confirmed. As shown in FIG. 4 (2), the date of birth, the address, and the married/unmarried status are input. As shown in FIG. 4 (3), the occupation is set. As shown in FIG. 4 (4), the reception area is set in a prefecture unit. As shown in FIG. 4 (5), an offer reception genre such as a restaurant or sweets is set. As shown in FIG. 4 (6), a confirmation e-mail is sent, and a rank representing the SNS communicativity is displayed.

FIG. 5 shows an example of subscriber registration data. As shown in FIG. 5, for example, in the case of the subscriber A, information is registered such that the name is Takeshi HARA, the birth date is Sep. 8, 1972, and the occupation is a company manager. In addition, the information communicativity basic score is calculated to be 12,000, the addition score by feedback is 160, the strength of category 1 is 50%, and the strength of category 2 is 20%. Although not shown, categories other than 1 and 2 exist, and the strength of the categories is 100% in total. Osaka Prefecture and Hyogo Prefecture are selected as the benefit receiving area. A restaurant, a cafe, etc. are selected as the benefit receiving genre. Although not shown in the figure, there are pubs, sports facilities, travel, campaigns, etc. as options.

In addition, e-mail addresses are also registered. Although not shown, information such as the necessity of reception of the e-mail magazine, the marriage status such as married or unmarried, or the presence or absence of a child are also registered.

Figure 6:
FIG. 6 is a user posting view, in which (1) shows an evaluation questionnaire input view, and (2) shows a share view.

FIG. 6 is a user posting screen, in which (1) shows an evaluation questionnaire input screen and (2) shows a share screen. When the screen shown in FIG. 6 (1) is scrolled downward, the screen shown in FIG. 6 (2) is displayed. When the button at the lower right of the screen shown in FIG. 6 (2) is tapped, a screen that enables posting on the SNS is displayed as shown in FIG. 6 (3).

FIG. 7 shows an example of information communicativity basic score data. Scoring is performed using the data shown in FIG. 7.

In the case of a subscriber A, the SNS type is Facebook (registered trademark). As for friends, the number of friends is 1,000 and the score of the number of friends is 100. Regarding posts, the number of posts is 20 and the number of posts score is 4. Regarding the response, the number of comments acquired is 20, the number of acquired comments score is 2, the number of likes acquired is 280, and the number of likes acquired score is 28. The number of days elapsed after the last posting is 2 days, and the score for number of days elapsed since the last posting is ±0.

As is well known, in the SNS, information such as post information and feedback is displayed in association with a user ID. The scoring server counts the number of friends, the number of posts, and the number of responses for each customer, as described in detail below.

Formula 1 below shows how to calculate the score of subscribers. As shown in Equation 1, the subscriber score is obtained by the sum of the basic score and the addition score. The basic score is obtained by multiplying the number of friends α times the coefficient X, the number of posts β for the past 30 days times the coefficient Y, and the number of responses γ for the past 30 days times the coefficient Z, all these being calculated. Here, the number of responses means the number of "likes" and also the number of comments. Note that the coefficients X, Y and Z are fixed for all subscribers.

In addition, the addition score is calculated by a sum of feedback data Δ representing the presence/absence of report execution after benefit execution multiplied by a factor W and feedback data E representing the number of responses to share posts after benefit execution multiplied by a factor V. Note that the feedback data Δ is calculated as 1 when a report after execution of a benefit is implemented, and as 0 when it is not implemented. The coefficients W and V are set at a fixed value for all subscribers. However, at the beginning of the subscriber registration, regardless of the added score and the category strength, the addition score is calculated using only the basic score.

Subscriber score=basic score+addition score here,Basic score=(α(N)×coefficient X)×(β(N)×coefficient Y)×(γ(N)×coefficient Z)

Addition score=(Δ1×α×coefficient W'E1×coefficient V)+(Δ2×α×coefficient W+E2×coefficient V)+ . . . +(Δn×α×coefficient W+En×coefficient V)  (Equation 1)

Also, a score calculation method different from the above method can be used. For example, Equation 2 below shows how to calculate the score of a subscriber. As shown in Equation 2, the method of calculating the subscriber score and the addition score is the same as the method shown in Equation 1 described above, but the method of calculating the basic score is different.

Namely, the basic score is calculated as the sum of the number of friends $\alpha$ multiplied by the factor X, the number of posts $\beta$ of the past 30 days multiplied by the factor Y, and the number of responses $\gamma$ of the past 30 days multiplied by the factor Z. Such a difference in the calculation method is because Formula 1 is a calculation method that places stronger emphasis on the spread of information in SNS rather than Formula 2. Thus, depending on the type of SNS, it is possible to use an appropriate calculation method.

Subscriber score=basic score+addition score here, Basic score=$(\alpha(N) \times$ coefficient $X)+(\beta(N) \times$ coefficient $Y)+(\gamma(N) \times$ coefficient $Z)$ Addition score=$(\Delta 1 \times \alpha \times$ coefficient $W+E1 \times$ coefficient $V)+(\Delta 2 \times \alpha \times$ coefficient $W+E2 \times$ coefficient $V)+ \ldots +(\Delta n \times \alpha \times$ coefficient $W+En \times$ coefficient $V)$ (Equation 2)

Formula 3 below shows how to calculate the category strength. At the time of feedback, the category strength N is set, and the posting frequency by genre at the time of feedback is considered in the calculation of the subscriber score. Specifically, +1 is added for each post, and the ratio of the number of specific genre posts to the total number of posts in the entire genre is calculated and displayed as a percentage.

$N$=Posts/Total posts$\times$100 (Equation 3)

Note that, in the calculation of the subscriber score, certain conditions may be set for $\alpha$, $\beta$ and $\gamma$. For example, with regard to the number of posts $\beta$, among the number of posts in the past 30 days, the number of responses of each post is required to be at least m1% of the number of friends, or with regard to the number of responses $\gamma$, a sum of responses to the top m2 posts out of all the responses in the past 30 days is considered to be the number of responses. Further, the calculation method is not limited to the above method, and a calculation method other than the above may be used.

Among the above calculation formulas, the subscriber score of the subscriber A is calculated as an example, using Equation 1 and Equation 3. In the case wherein the number of friends $\alpha$ of the subscriber A is 1,000, the number of posts $\beta$ of the past 30 days is 20, the number of responses of the past 30 days is 300, the coefficient X is 0.1, the coefficient Y is 0.2, the coefficient Z is 0, the coefficient W is 0.1, the coefficient V is 0.2, the feedback data $\Delta 1$ is present, and the feedback data E1 is 30, the subscriber score of the subscriber A is as shown in Equation 4 below. Note that the category strength of the subscriber A is one posting for category 1 in the total number of postings.

The subscriber score of the subscriber $A$=(1,000$\times$0.1)$\times$(20$\times$0.2)$\times$(300$\times$0.1)+(1$\times$1,000$\times$0.1)+(30$\times$0.2)=(100$\times$4$\times$30)+100+6=12,106 (Equation 4)

Next, the subscriber score of the subscriber A is calculated using Equation 2 and Equation 3. In the case wherein the number of friends a of the subscriber A is 1,000, the number of posts $\beta$ for the past 30 days is 20, the number of responses $\gamma$ for the past 30 days is 300, the coefficient X is 1, the coefficient Y is 2, the coefficient Z is 1, the coefficient W is 1, the coefficient V is 2, the feedback data $\Delta 1$ is present, and the subscriber score of the subscriber A becomes the one as shown in the numerical equation 5 below when the feedback data E is 30. Note that the category strength of the subscriber A is one posting for category 1 in the total number of postings.

The subscriber score of the subscriber $A$=(1,000$\times$1)+(20$\times$2)+(300$\times$1)+(1$\times$1,000'1)+(30$\times$2)=1,000+40+300+1,000+60=2,400 (Equation 5)

FIG. 9 is a flowchart showing steps from the offer registration, the disclosure, and through the application of the scoring server of the Embodiment 1. As shown in FIG. 9, the advertiser offer registration is performed (the advertiser offer preparation and registration process: S21). Next, the target is narrowed (the offer delivery target narrowing step: S22). The offer is presented to the subscriber (the subscriber presenting process of the offer: S23). A subscriber applies for an offer (the offer application process: S24). Also shown is registration of the offers for subscribers and the applications by subscribers (offer/application DB registration step: S25).

FIG. 10 shows the advertiser offer registration data. As shown in FIG. 10, settings for benefit offer contents (benefit invitation content) and narrowing by benefit offerer (benefit invitees) are registered. Specifically, for the benefit offer content, offer date, offer time zone, number of set offer, number of people per set, offer title, offer target content, offer price/discount rate of benefit, image registration of benefit content, product purchase EC site URL, questionnaire items, etc. are set. In addition, as for the narrowing setting by the benefit offerer, SNS type in use, gender, occupation, married/single, SNS communicativity, report entry rate/number of entries, questionnaire evaluation tendency, share rate/share number etc. are set.

Figure 11:
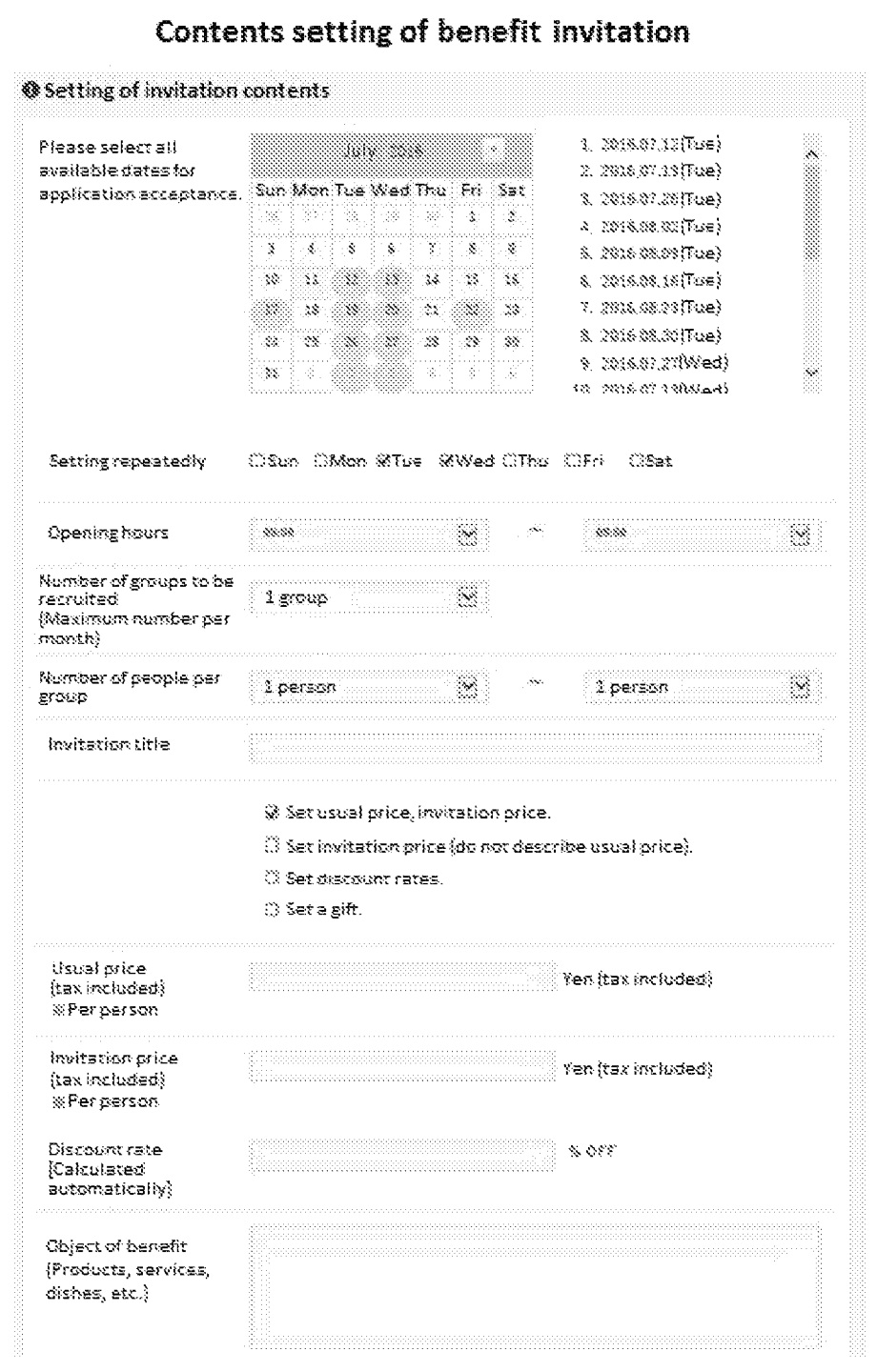

FIG. 11 illustrates an example of an advertiser offer creation screen (setting of benefit offer content) according to Embodiment 1. As shown in FIG. 11, in setting the benefit invitation content, first, all the application acceptable dates are selected. Repeat setting is done by checking. Also shown are ways to specify the entry time zone, set the monthly upper limit of groups, specify the number of people in one group from the lowest to the highest, and specify the invitation title. In addition, the regular price, the invitation price, the discount rate, and the present (in sense of "gift") (objects for benefits such as products, services, dishes) are set. Enter the regular price, the invitation price or the contents of the present according to the checked items. Here, the present refers to an object of benefits such as products, services, and dishes. Note that the discount rate is automatically calculated from the input value.

For example, if the advertiser is a pub and offers food and drink at a 30% discount, enter the name of the pub in the item of the invitation title, or enter "Provide a 30% discount on food charges", etc. In addition, if the advertiser is a hotel and offers a room rate of 50% discount, it is possible to enter the name of the hotel in the item of the invitation title, or enter "provide 10,000 yen per night room for 5,000 yen" message, etc.

Here, in order to display cheap prices and the like in an easy-to-understand manner to subscribers, a normal price and an invitation price may be set, or only the invitation price may be displayed. Note that the name of the advertiser can be displayed separately from the invitation title on the subscriber offer display screen shown in FIG. 13 without entering the item of the invitation title.

When the column for setting the discount rate is checked, for example, if the above-mentioned advertiser sets the regular price as "10,000 yen" and the invitation price as "7,000 yen" in the example of a pub, a display such as "30%

OFF" will be set automatically. In the example of the hotel, if the advertiser sets the regular price to "10,000 yen" and the invitation price to "5,000 yen", the display such as "50% OFF" will be set automatically.

In the setting of the narrowing-down of the benefit invitation content and the benefit invitee, for example, although it is necessary to always input the required items such as the application available date, for example, the non-essential items such as the repetition setting may or may not be input. It is possible to change the setting in the scoring server as to which items are compulsory.

FIG. 12 shows an example of an advertiser offer creation screen (target filtering setting) of Embodiment 1. The target filtering setting is the narrowing setting of the benefit invitees. As shown in FIG. 12, the setting for narrowing-down the benefit invitees is performed by specifying the following items. The items are the type of SNS, gender, age group, occupation, married or single, SNS communicativity, designated month of birth. Here, settings can be made using the respective check boxes for including subscribers who had been invited in the past, excluding subscribers who have a low report entry rate, or excluding subscribers who tend to have a low questionnaire evaluation. Also, invitation conditions can be stored for the convenience of the next search. The setting of the conditions is optional for any item, and if not set, the item becomes intended for all subscribers.

For example, the type of SNS may be Facebook (registered trademark), the gender may be male, the age group may be 30 to 45, and no designation may be made for occupation, whether married or single, SNS communicativity or designation of birth month. In addition, as to SNS communicativity, it is also possible to designate based on a score of "12,000 or more", for example, or to designate the number of benefit invitees such as "upper 500 people".

In addition, although not displayed here, an item allows one to narrow down the residence location, work location, etc. of the benefit invitee by dividing the area into certain sub-areas in advance and specifying the area at the time of setting.

For the above items, when a search is performed by the search button on the lower right of the screen, the search results are displayed. In FIG. 12, 204 people are extracted (selected).

FIG. 13 shows a subscriber offer display screen. The screen shown in FIG. 13 (1) and the screen shown in FIG. 13 (2) relate to different subscriber offers. As shown in FIGS. 13 (1) and 13 (2), in any of the subscriber offer display screens, a benefit content, an area, a recruitment period indicating a publication date and a closing date, the number of recruitment groups and an application button are displayed. Further, in the screen shown in FIG. 13 (1), a range is specified not only for the number of recruitment groups but also for the number of people in one group.

In addition to the above, it is possible to display provision conditions such as a schedule, whether or not being accompanied by children, an address, and the like. In that case, the address may be linked with the map service. The above information is not disclosed to anyone other than the target subscribers.

The name of the advertiser can be displayed as shown in FIG. 13 (1) or can be not displayed as shown in FIG. 13 (2).

FIG. 14 shows a subscriber offer application screen. In the screen shown in FIG. 14 (1), by scrolling downward, the screen shown in FIG. 14 (2) and further the screen shown in FIG. 14 (3) are displayed. First, in the screens shown in FIGS. 14 (1) and (2), the detailed information of the benefit invitation content is displayed and can be confirmed. On the screen shown in FIG. 14 (3), one may select the date of arrival, time to enter the store and the number of participants, and then by tapping the button displayed on the bottom of the screen shown in FIG. 14 (3), transition is made to the final application confirmation screen (not shown), and the application is completed by tapping the application complete button.

FIG. 15 shows an advertiser offer/application information DB (database). As shown in FIG. 15, for application information of a subscriber A recorded on the database the offer ID is "00100002", the application date is "Aug. 11, 2016", the subscriber ID is "000023", the subscriber name is "HARA, Takeshi", and the SNS communicativity LV is "30", the number of people is "4", the comment column is "one child", visit date/benefit execution date is "Aug. 25, 2016", smoking condition is "Available", child accompaniment condition is "Accompanied" by children. It also records contact phone numbers, addresses and e-mail addresses.

Behavior, posting, and response conducted by a subscriber after receiving a benefit are detected at a scoring server, which produces a report on the result, notifies the advertiser, and re-scores information communicativity in the SNS.

Figure 16:
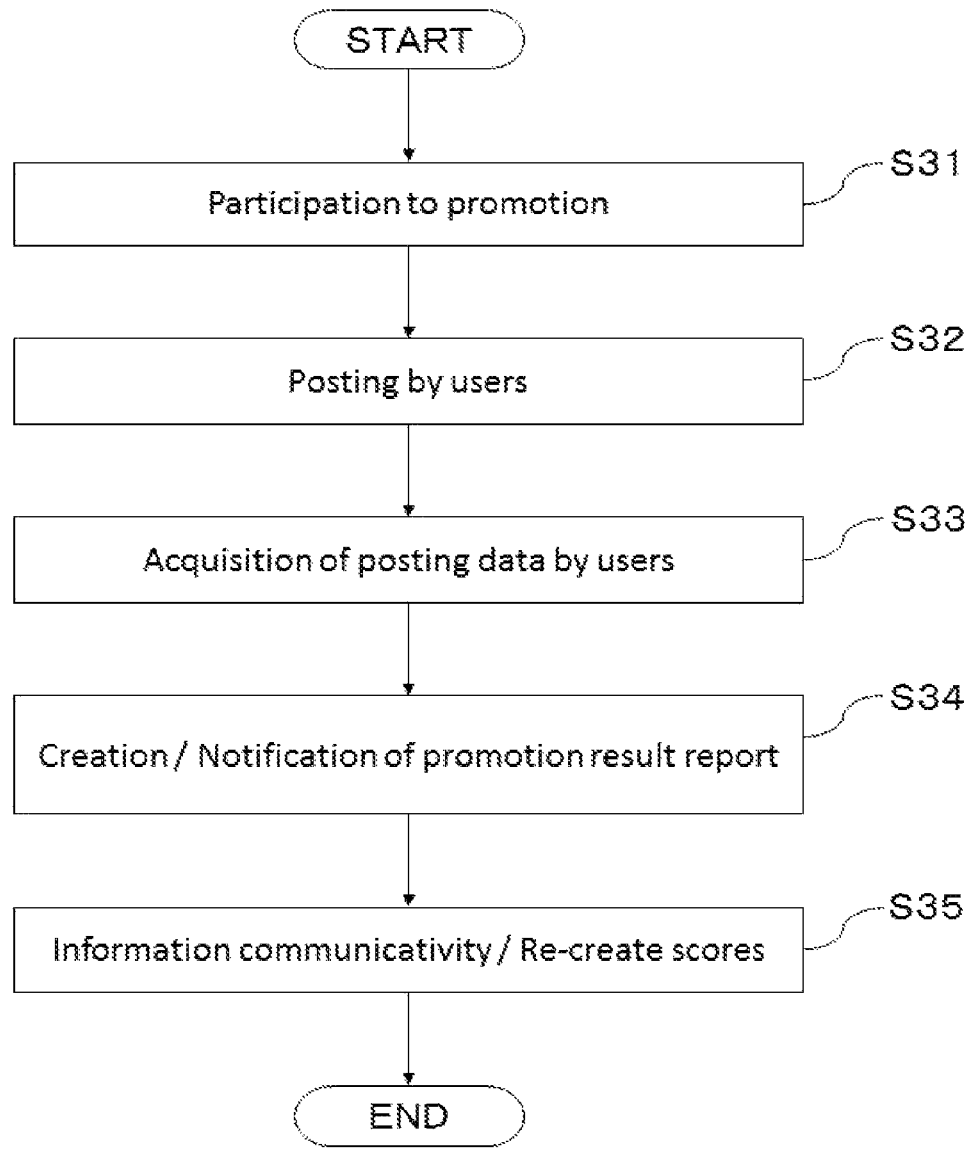
FIG. 16 is a flow chart showing steps from promotion participation of a scoring server to an acquisition of user posting data, acquisition of data, registration of reports, re-creating scores, and acquisition of promotion data.

FIG. 16 shows a flow diagram of the scoring server of Embodiment 1, with user participation, data acquisition, report registration, re-scoring, and promotion data acquisition from the participation of promotion. As shown in FIG. 16, first, the player participates in the promotion (subscriber's promotion participation process: S31). Then, the embodiment performs user posting (user posting process: S32). This means that a promotion report is created. User post data is acquired (user post data acquisition step: S33). The embodiment creates a report on promotion results and notification (advertiser promotion result report creation and notification process: S34). The information communicativity is re-scored (information communicativity re-scoring step: S35).

Figure 17:
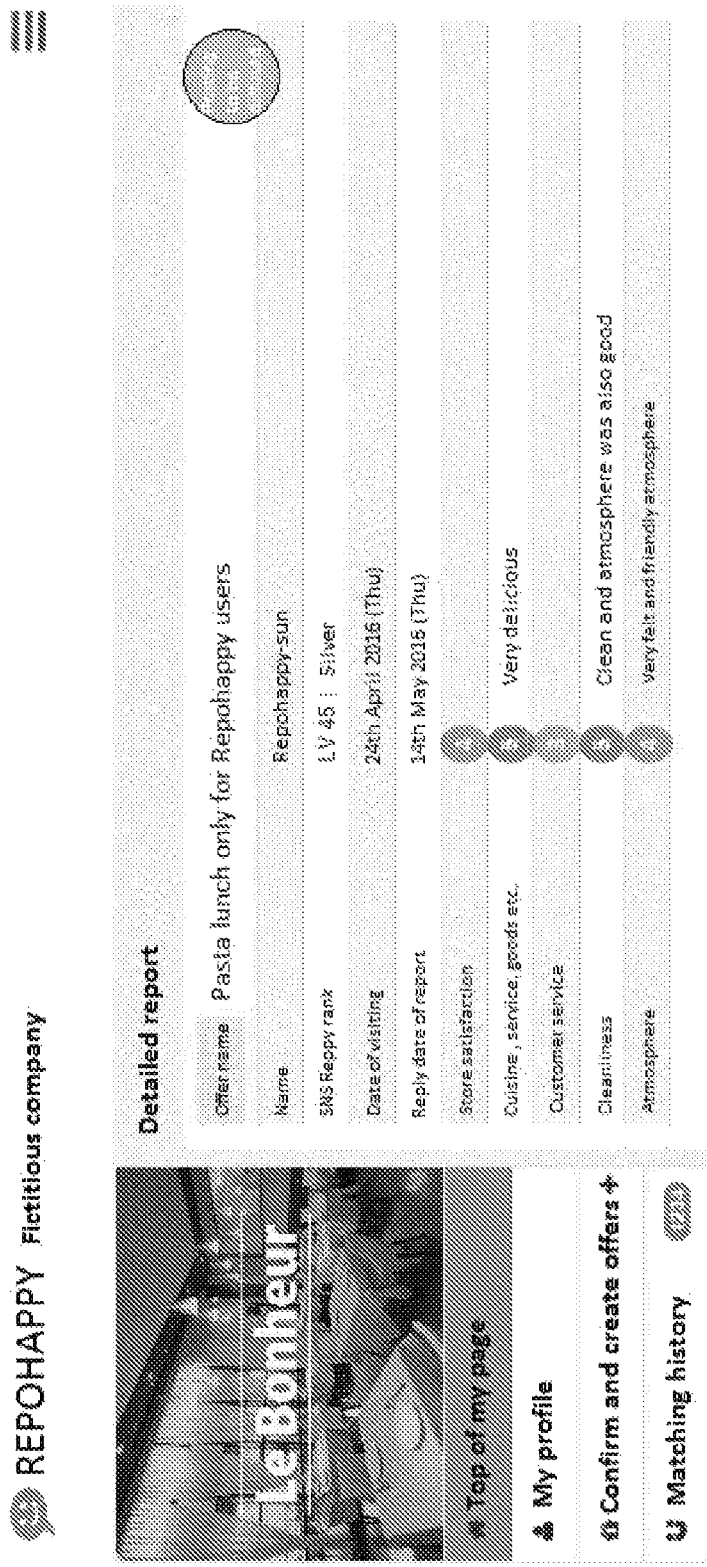
FIG. 17 is a report on advertiser promotion results.

FIG. 17 shows an advertiser promotion results report. As shown in FIG. 17, on the report detail screen, the offer name, the SNS communicativity LV (rank or level), the visit date, and the report response date are displayed. In addition, with regard to the degree of satisfaction, the evaluation of the customer's satisfaction, the feeling of cleanliness, and the atmosphere, such as the degree of satisfaction with the shop, food, service, and products, is displayed as graded up to five.

FIG. 18 shows an information diffusion posting screen (share assistance function) that the subscriber voluntarily performs after the benefit execution. As shown in FIG. 18, the subscriber can post to the SNS to be used by tapping the link on the site provided by the scoring server.

FIG. 19 shows an example of a subscriber score recalculation table. As shown in FIG. 19, a recalculation is performed using recalculation ID, addition date, addition subscriber ID, score before recalculation, report entry presence, report entry presence score, share post presence after report, share post response number after report, share post response number score after report, intensity added category and category post total number.

In this embodiment, the recalculation ID is "20001", the addition date is "Aug. 26, 2016", the addition subscriber ID is "000232", the recalculation score is "12,000", the report entry presence is "1", "the report entry presence score is "100", the share post presence after report is "1", share post response number after report is "30", the share response number score after report is "6", the intensity added category is "+1" and the category posting total number is "1".

Figure 20:
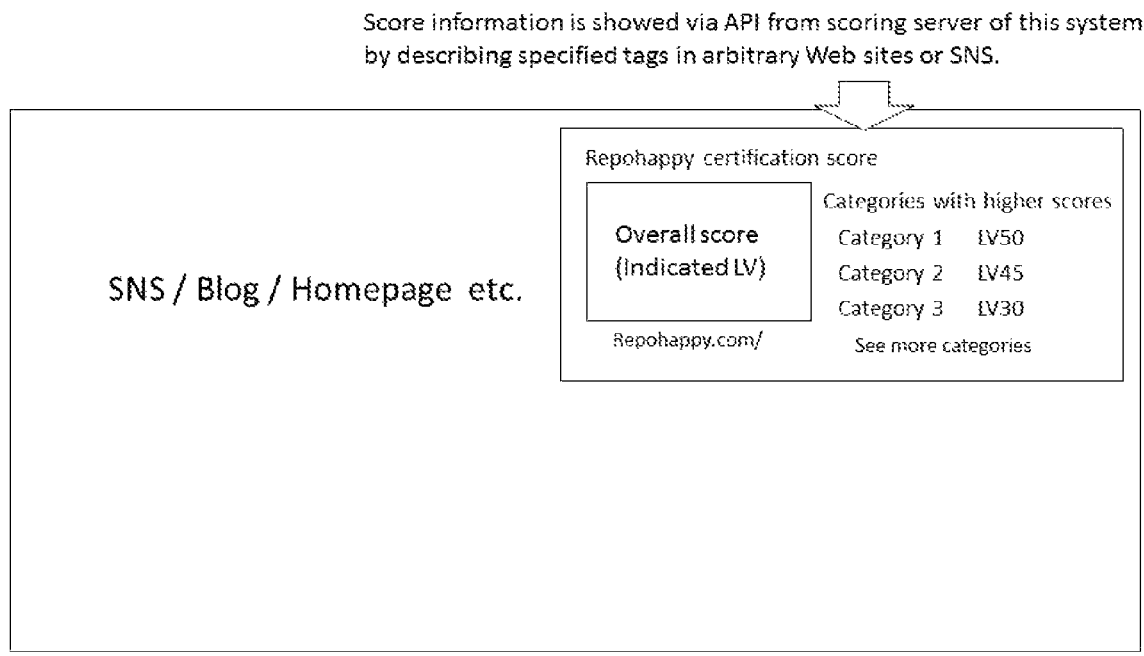
FIG. 20 is a tag view for subscribers.

FIG. 20 shows a subscriber tag display screen. As shown in FIG. 20, the subscriber can display the score information via API from the scoring server in the scoring server of the present embodiment by describing the designated tag in the SNS, blog, home page, etc. used by the subscriber himself or herself.

Specifically, a JavaScript (registered trademark) tag is issued so that the subscriber can display the measured information communicativity on any website.

Subscribers can use the issued tags to display their own ability to transmit information on any website. Also, it can provide tag information to websites that subscribers accept.

Figure 21:
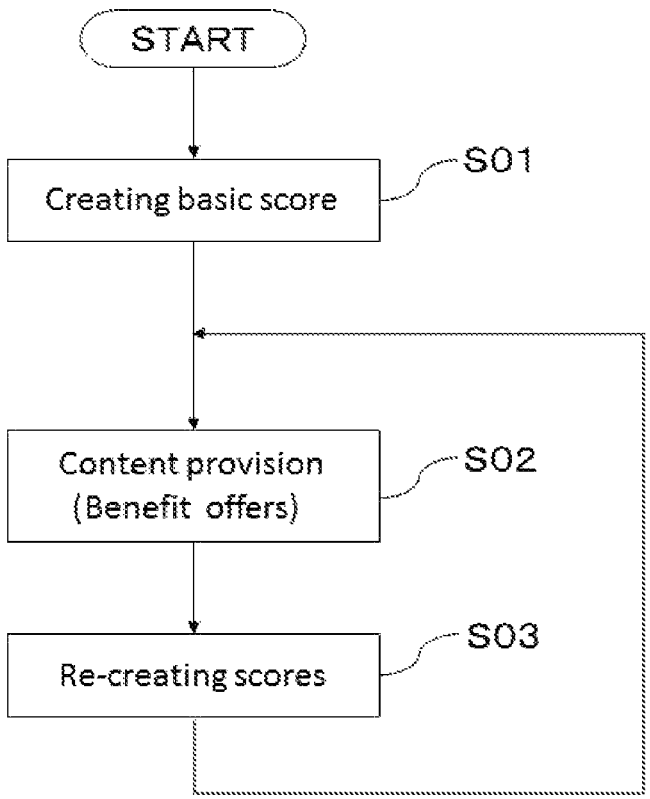
FIG. 21 is an overall flow diagram of the scoring server according to Embodiment 1.

FIG. 21 shows an overall flow diagram of the scoring server of Embodiment 1. As shown in FIG. 21, first, basic scoring is performed based on data registered from the subscriber terminal in the scoring server and data obtained by the scoring server from the SNS server (S01).

Next, content provision (benefit offer) is performed from the content provision terminal (S02). Content provision may be performed after narrowing down targets, or may be provided to all subscribers without narrowing down targets. Here, the content may be provided before the basic scoring of the subscriber is performed, in which case the content can be viewed immediately after the basic scoring.

Rescoring is performed when browsing, application or evaluation of content is performed by the subscriber terminal (S03). With regard to this content provision, re-scoring is performed each time the content is browsed, subscribed, or evaluated. Also, if different content is provided, rescoring is performed each time the content is used.

Furthermore, not only the behavior of the subscriber terminal that made an application for content, etc., but also the response from the other SNS users to the behavior of the subscriber who made the application, etc. is an element of rescoring.

In addition, not only the number of actions and responses, but also the interest/zest of each subscriber and action characteristics can be taken into account to enable more accurate scoring of information communicativity.

It should be noted that re-scoring may be performed in response to a specific action from a subscriber or a subscriber's friend on SNS, or re-scoring may be performed automatically regardless of the specific action.

For example, it is possible to automatically perform rescoring every certain period, with the number of comments within a certain period as an element of rescoring against subscriber's post regarding contents.

Figure 22:
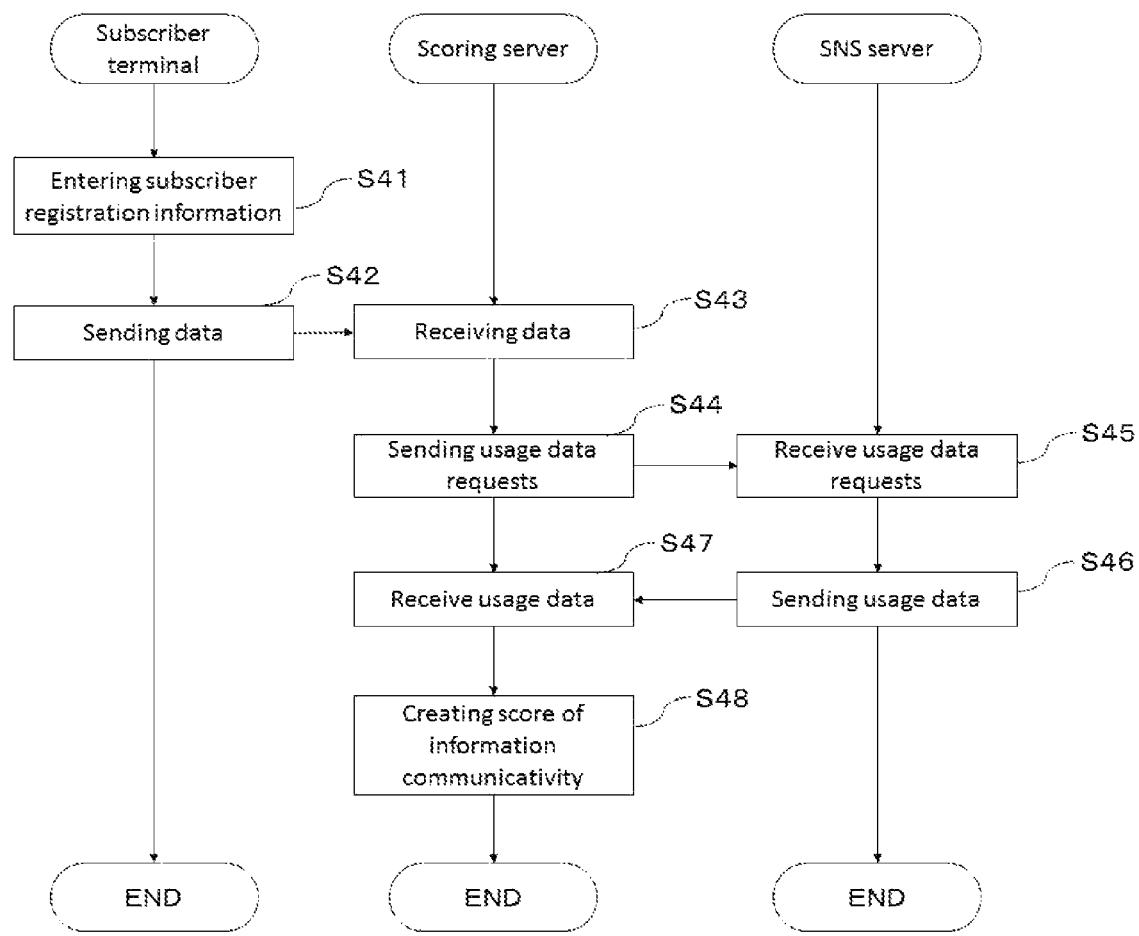
FIG. 22 is a data flow diagram of basic scoring.

FIG. 22 shows a data flow diagram of basic scoring. As shown in FIG. 22, subscriber information is input (S41). Data on subscriber information is transmitted from the subscriber terminal to the scoring server (S42). The scoring server receives data on subscriber information (S43). The scoring server sends a subscriber data usage request to the SNS server (S44). The SNS server receives a subscriber usage data request (S45). The usage data of the subscriber is transmitted from the SNS server to the scoring server (S46). The scoring server receives subscriber usage data (S47). Scoring of information communicativity is performed (S48).

Figure 23:
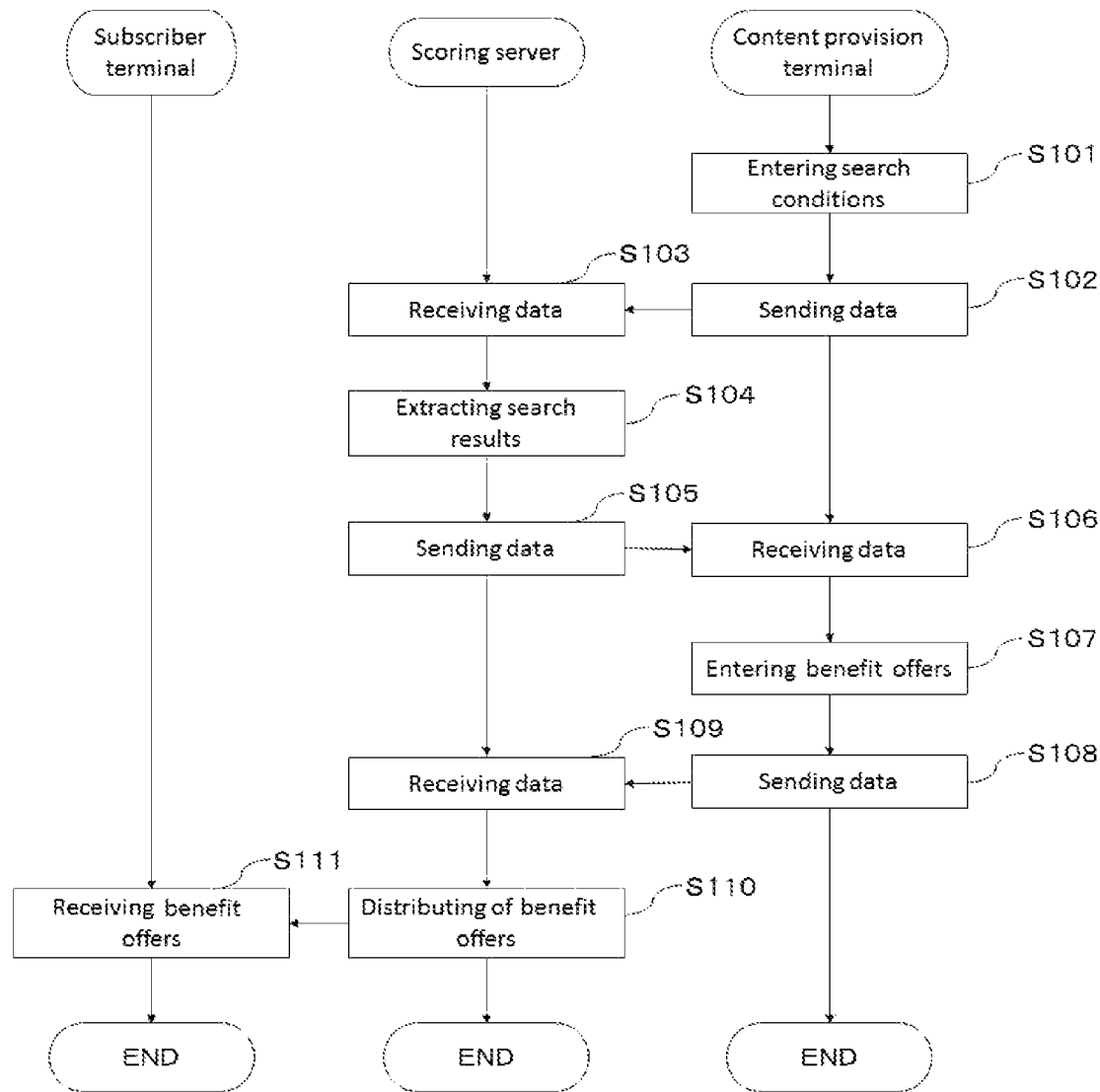
FIG. 23 is a data flow diagram of content provision (benefit to offer).

FIG. 23 shows a data flow diagram of content provision (benefit offer). As shown in FIG. 23, first, search conditions are input in the content provision terminal (S101). The data related to the input search condition is transmitted from the content provision terminal to the scoring server (S102). The scoring server receives data on the search condition (S103). The scoring server extracts a search result based on the received search condition (S104). Data on the extracted search result is transmitted from the scoring server to the content provision terminal (S105). The content provision terminal receives data related to the search result (S106).

At the content provision terminal, the benefit offer is input (S107). Data regarding the input benefit offer is transmitted from the content provision terminal to the scoring server (S108). The scoring server receives data on the input benefit offer (S109). The benefit offer is distributed from the scoring server to the subscriber terminal (S110). At the subscriber terminal, the benefit offer is received (S111).

Figure 24:
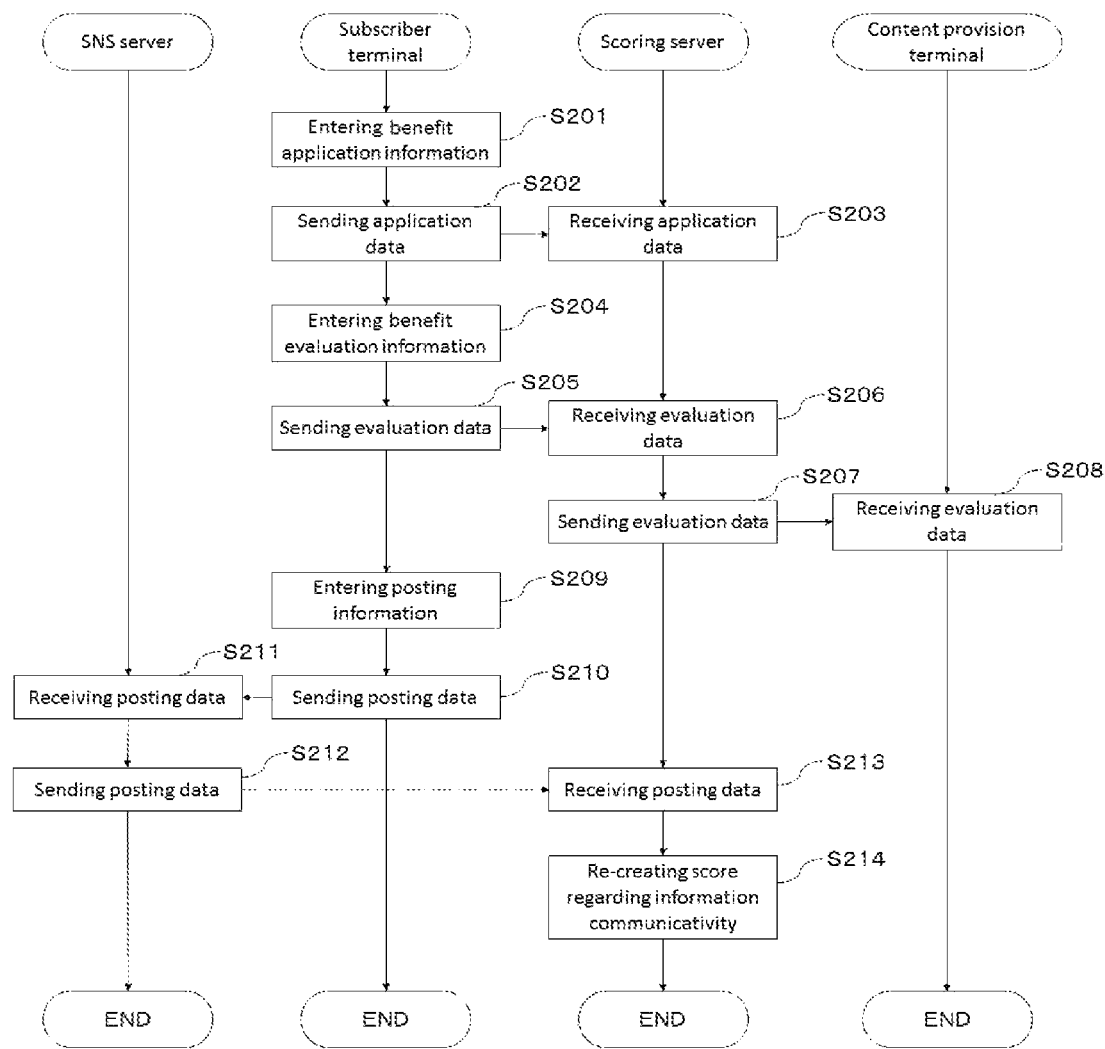
FIG. 24 is a data flow diagram of re-creating scores.

FIG. 24 shows a data flow diagram of rescoring. As shown in FIG. 24, first, benefit application information is input at the subscriber terminal (S201). Data on the benefit application is transmitted (S202). The scoring server receives data on the benefit application (S203).

Further, in the subscriber terminal, benefit evaluation information is input (S204). Data on benefit evaluation is sent (S205). The scoring server receives data on the benefit evaluation (S206). Data on benefit evaluation is transmitted from the scoring server to the content provision terminal (S207). The content provision terminal receives data related to the benefit evaluation (S208).

Furthermore, the subscriber can optionally post to the SNS, and inputs post information (S209). The input post data is transmitted from the subscriber terminal to the SNS server (S210). The post data is received at the SNS server (S211). The SNS server transmits the received post data to the scoring server (S212). The scoring server receives the post data (S213). After the predetermined period has elapsed, rescoring of information communicativity is performed (S214).

FIG. 8 is a function explanation diagram of the scoring server of Embodiment 1. When the subscriber 2 registers on the scoring server 1, the information communicativity of the subscriber 2 is measured based on the usage status of the SNS platform 3. The advertiser 4 targets an advertisement delivery destination out of a large number of subscribers, using subscriber registration information and information communicativity as a search condition, and delivers an advertisement to the browser on the subscriber 2 device. Subscriber 2 looks at the advertisement and reacts. According to the reaction by subscriber 2, information communicativity is rescored.

In Embodiment 1, the configuration in which the target is narrowed down in the content provision terminal is shown, but it is also possible to provide the content without narrowing down the targets.

Figure 25:
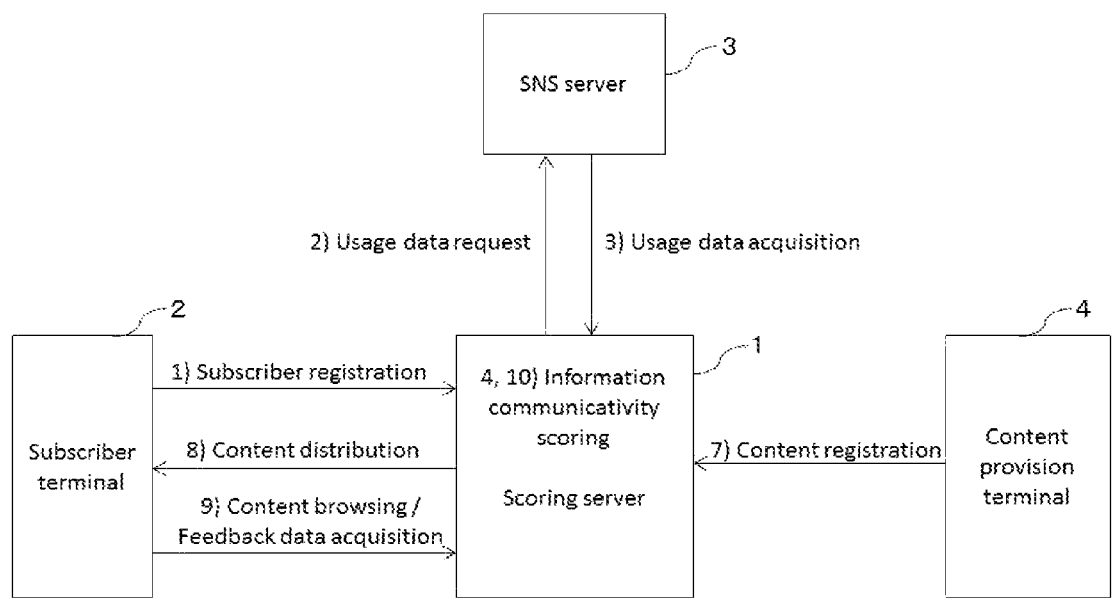
FIG. 25 is a functional block diagram of a scoring server according to Embodiment 2.

FIG. 25 shows a functional block diagram of the scoring server of Embodiment 2. As shown in FIG. 25, in the subscriber terminal 2, when the 1) subscriber registration is performed, the subscriber information is stored in the scoring server 1. Based on the registered subscriber information, the scoring server 1 2) requests usage data regarding the subscriber 2 from the SNS server 3. The scoring server 1 3) obtains usage data from the SNS server 3. The scoring server 1 4) performs scoring of information communicativity.

Unlike Embodiment 1, the content provision terminal 4 does not narrow down the target, but targets all the subscriber terminals and 7) performs content registration to the scoring server 1. Content is 8) distributed from the scoring server 1 to the subscriber terminal 2. In addition, 7) content registration may be performed before 1) subscriber registration in the subscriber terminal 2, for example. In this case, the content is 8) distributed immediately after the 1) subscriber registration.

When the subscriber 2 9) browses the content, feedback data regarding the content browsing is sent to the scoring server 1. The scoring server 1 10) performs the scoring of the information communicativity for content browsing.

Figure 26:
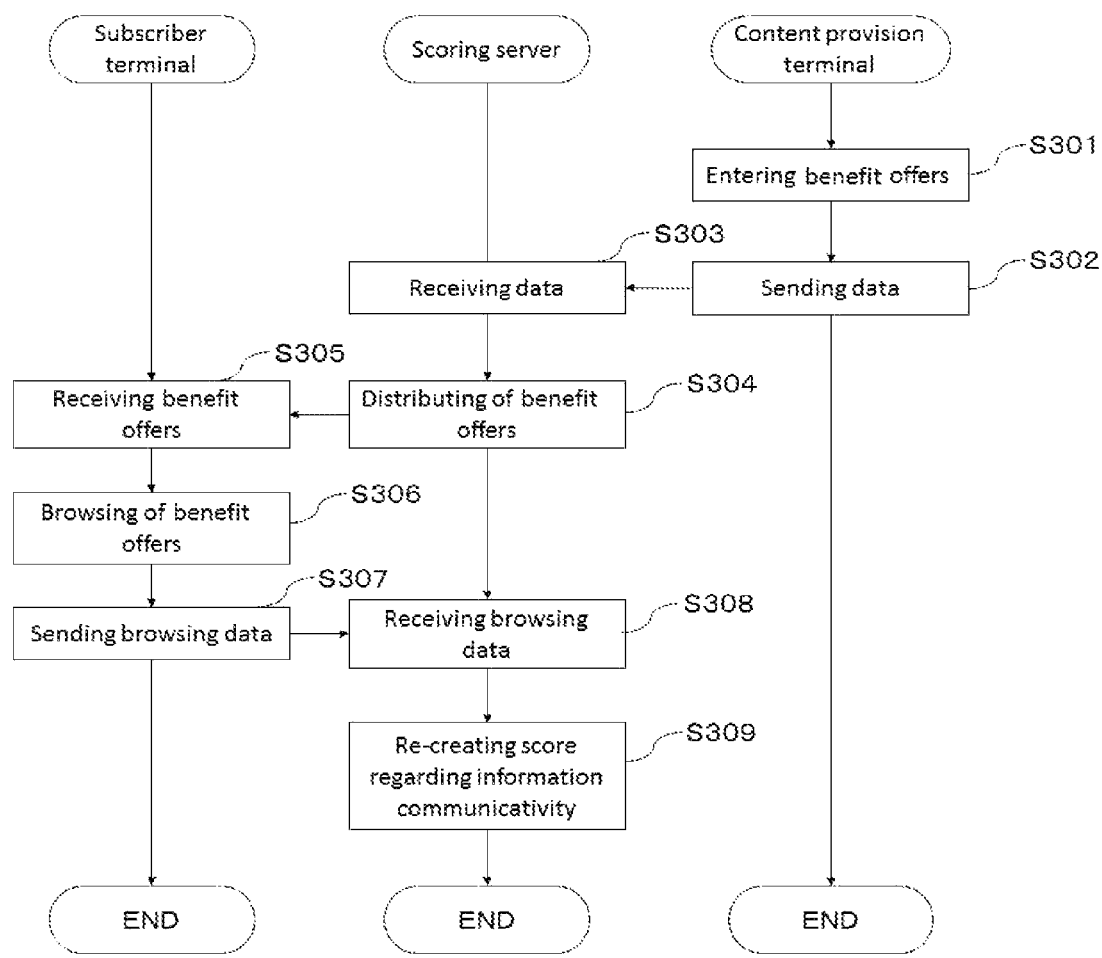
FIG. 26 is a flow diagram relating to the viewing of benefits to offer, of the scoring server according to Embodiment 2.

FIG. 26 shows a flow diagram of the scoring server of Embodiment 2 regarding benefit offer viewing. As shown in FIG. 26, in the content provision terminal, a benefit offer is input (S301). The data related to the input benefit offer is transmitted from the content provision terminal to the scoring server (S302). The scoring server receives data on the entered benefit offer (S303). The benefit offer is distributed from the scoring server to the subscriber terminal (S304). At the subscriber terminal, the benefit offer is received (S305).

When the received benefit offer is browsed (S306) in the subscriber terminal, data regarding browsing is transmitted from the subscriber terminal to the scoring server (S307), and the scoring server receives data regarding browsing (S308). The scoring server performs re-scoring of the information communicativity based on the received data on browsing (S309).

FIG. 27 is an example of an advertiser offer creation screen according to Embodiment 3, in which (1) shows an example of a screen for narrowing down content display targets, and (2) shows an example of a screen for narrowing down target numbers. In this embodiment, unlike Embodiment 1, items for reflecting data on the interests and concerns of subscribers, the number of responses, and the like in the search are provided.

First, as shown in FIG. 27 (1), the contents display target is narrowed down. Specifically, it becomes possible to set conditions such as age range, gender, marital status, children's presence, birth month setting, SNS information communicativity, and interest/concern. Although the SNS information communicativity is set to be input as the level calculated from the information communicativity score here, the information communicativity score itself may be an item to be input. Although items such as gourmet, travel, parenting, education, politics, movies, and health are listed as items to be narrowed down, by interest/concern, items other than these can be set. Moreover, the item selection is not limited to one, and multiple selections are possible. Further, the search conditions can also be stored by putting a check in the field for storing the search conditions.

Here, an age range of several decades is set from 20ies to 40ies, for gender only women is set, for marital status only married is set, for childrens' presence only primary school children are present is set. In addition, there is a birth month setting, and SNS information communicativity is set to 3 or more. For items to be narrowed down by interest/concern, the gourmet section is checked. As a result, the content display target is temporarily narrowed down.

By the above input, subscribers to be targeted are narrowed down once. As shown in FIG. 27 (2), the target number of people is 2,500, Facebook (registered trademark) users are 1,200, Twitter (registered trademark) users are 800, Instagram (registered trademark) users are 800, Line (registered Trademark) users are 2200, respectively. On the left side of the total number of people for each SNS, "Can be delivered to maximum 3,500 people" is displayed. Here, the reason that the maximum number of people that can be delivered is not the total number of all SNSs, in the event that the SNSs used by a subscriber are not limited to one, such as in the case where a Facebook (registered trademark) user is simultaneously a Twitter (registered trademark) user, for example.

From the above target subscribers, priority is then selected to further narrow down the subscribers. As shown in FIG. 27 (2), items may be prioritized in order of interest/concern, order of subscribers with a small number of delivered invitations, order of number of responses, order of SNS communicativity, by automatic selection at random or with all subscribers. Note that an invitation means a benefit offer.

For example, if the item "order of interest/concern" is selected, subscribers with high interest/concern can be extracted preferentially. By selecting the item "subscribers with a small number of invitations to be delivered", subscribers with a small number of invitations to be distributed can be preferentially extracted. Similarly, a subscriber with a large number of responses can be extracted by selecting the item "order by number of responses", and a subscriber with a high SNS communicativity can be preferentially extracted by selecting the item "by SNS communicativity order". In this embodiment, the setting of extracting 200 persons in order of interest/concern is performed.

A plurality of priority ordering items can be selected, and the number of persons to be extracted can be set for each item. In addition, regardless of the priority, if it is desired to distribute a benefit offer to a fixed number of subscribers, the item "automatically selected at random" is selected. Note that if you do not want to set the above-mentioned priority and you want to distribute benefit offers to all targeted subscribers, select the item "all subscribers".

When the selection of the item is completed, the button "search" in the lower left of the screen is clicked to execute the search. The search results are displayed at the lower right of the screen, and detailed search results can be viewed by clicking "search results" (not shown). In the detailed search results, subscribers are displayed in order from the subscriber with the highest priority.

In this way, it is possible to narrow down the optimal target based on the needs of the content provider, in ways such as narrowing down the target based on the interests and concerns of the subscribers and displaying the subscribers with the higher number of responses at higher ranks.

Other Embodiments (1) In calculating the basic score, unlike Embodiment 1, items other than the number of friends $\alpha$, the number of postings $\beta$, or the number of responses $\gamma$ may be provided. Conversely, basic score calculation may be limited to one or two of the number of friends $\alpha$, the number of postings $\beta$, and the number of responses $\gamma$.

(2) In calculating the added score, an embodiment may be configured to require API communication with the SNS server, or it may be configured such that it is not necessary.

INDUSTRIAL APPLICATION APPLICABILITY

The present invention is useful as an advertisement system using SNS.

EXPLANATION OF SIGNS

1 Scoring server
1a, 31a, 32a Database
2, 21, 22 Subscriber terminal (subscriber)
3, 31, 32 SNS server (SNS platform)
4, 41, 42 Content provision terminal (advertiser)
5 Network
6a-6g Arrow

What is claimed is:
1. A scoring server, the scoring server characterized by being connected by a network to a subscriber terminal, a social networking service (SNS) server, and a content provision terminal, wherein the scoring server comprises:

a computer;
a program which upon execution by the computer:
(a) communicates a usage data request to the SNS server;
(b) acquires usage data from the SNS server, the usage data representing usage of the SNS by a subscriber;
(c) creates a score of the subscriber's information communicativity based at least in part on the usage data;
(d) receives content from the content provision terminal;
(e) provides at least a portion of the received content to the subscriber terminal;
(f) acquires from the subscriber terminal a feedback data regarding an acceptance of the content and a feedback data regarding an evaluation of the content;
(g) recreates the subscriber's information communicativity score each time the content is provided from the content provision terminal using the feedback data regarding an acceptance of the content, the feedback data regarding an evaluation of the content, an action history regarding a content introduction posting on the SNS server, and responses to the content introduction posting actions on the SNS server in relation to the content provided to the subscriber terminal as feedback elements; and
(h) notifies the content provision terminal of the recreated communicativity score;
thereby improving an SNS targeting functionality accuracy of searching SNS subscribers using the recreated communicativity score.

2. The scoring server as set forth in claim 1, wherein the score is calculated based on at least one of: a posting amount, a posting frequency, and a number of responses in one or more SNS services provided by the SNS server.

3. The scoring server as set forth in claim 1, wherein the action history comprises a posting and sharing action directed to the SNS server, and the one or more responses to the action comprise reaction operations performed by friends or followers of the subscriber communicating to the SNS server including one or more of: browsing, inputting comments, and sharing actions.

4. The scoring server as set forth in claim 1, wherein the score is calculated based on actions during a predetermined period in the past.

5. The scoring server as set forth in claim 1, wherein re-creating the score comprises performing a calculation based on a number of responses to the subscriber's actions of posting from the subscriber terminals to the SNS service, and wherein said number of responses is provided by the SNS server.

6. The scoring server as set forth in claim 1, wherein re-creating the score comprises performing a calculation using information obtained from a questionnaire about the content provided to the subscriber terminal.

7. The scoring server as set forth in claim 1, wherein re-creating the score comprises performing a calculation using a presence or absence of browsing action of the subscriber terminal with respect to contents.

8. The scoring server as set forth in claim 1, wherein the content provision terminal filters the subscriber providing the content based on the subscriber registration information and the score calculated.

9. The scoring server as set forth in claim 1, wherein re-creating the score comprises performing a calculation based on a value for each category type of the content.

10. The scoring server as set forth in claim 9, wherein re-creating the score comprises performing a calculation using category strengths for each category type as parameters of scoring.

11. The scoring server as set forth in claim 1, wherein the content includes at least one of: a discount service offering, a free ticket offering, or an advertisement content.

12. The scoring server as set forth in claim 1, wherein the program calculates the score, when the SNS service provided by the SNS server does not disclose the data for calculating the subscriber's information communicativity, by automatically visiting the SNS site of the subscriber, and by reading text data, and by extracting at least one of: a number of followers, a number of friends, a posting amount, a posting frequency, or a number of responses.

13. The scoring server as set forth in claim 1, wherein the scoring server automatically reads the web page of a follower by tracing the subscriber's follower link and extracts data for calculating the subscriber's information communicativity.

14. The scoring server as set forth in claim 1, wherein the score calculated is provided in accordance with requests from an external server.

15. The scoring server as set forth in claim 1, wherein a parameter of category strength for each category type is provided in accordance with requests from an external server.

16. The scoring server as set forth in claim 1, wherein the scoring server transmits a dedicated code generated according to subscriber registration information composed of tags or alphanumeric characters to the subscriber terminal, and when there are inquiry requests from other computers, responds with the score of the subscriber corresponding to the dedicated code, and causes other computers to show the score of the subscriber by communicating with the tag.

17. A processing method suitable to be performed in an environment which includes a scoring server that is connected by a network to a subscriber terminal, a social networking service (SNS) server, and a content provision terminal, wherein the method comprises the scoring server:
(a) communicating a usage data request to the SNS server;
(b) acquiring usage data from the SNS server, the usage data representing usage of the SNS by a subscriber;
(c) creating a score of the subscriber's information communicativity based at least in part on the usage data;
(d) receiving content from the content provision terminal;
(e) providing at least a portion of the received content to the subscriber terminal;
(f) acquiring from the subscriber terminal a feedback data regarding an acceptance of the content and a feedback data regarding an evaluation of the content;
(g) re-creating the subscriber's information communicativity score each time the content is provided from the content provision terminal using the feedback data regarding an acceptance of the content, the feedback data regarding an evaluation of the content, an action history regarding a content introduction posting on the SNS server, and responses to the content introduction posting actions with respect to the SNS server in relation to the content of the subscriber terminal as feedback elements; and
(h) notifying the content provision terminal of the recreated communicativity score;
thereby improving an SNS targeting functionality accuracy of searching SNS subscribers using the recreated communicativity score.

18. The processing method of claim 17, further comprising prioritizing subscribers based on SNS communicativity and at least one of: age, gender, marital status, interests, parental status.

19. The processing method of claim 17, wherein a basic communicativity score is calculated based on at least a number of friends, a number of posts in a specified time period, and a number of responses in a specified time period, and wherein the communicativity score depends on the basic communicativity score and the feedback elements.

20. The processing method of claim 17, wherein a sum of responses in a specified time period to a top subset of posts is considered to be the number of responses.

\* \* \* \* \*